United States Patent
Katayama et al.

(10) Patent No.: US 11,638,068 B2
(45) Date of Patent: Apr. 25, 2023

(54) MOBILE ENTITY TRACKING DEVICE AND METHOD FOR TRACKING MOBILE ENTITY

(71) Applicant: PANASONIC INTELLECTUAL PROPERTY MANAGEMENT CO., LTD., Osaka (JP)

(72) Inventors: Yuma Katayama, Kanagawa (JP); Junko Ueda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 178 days.

(21) Appl. No.: 16/753,135

(22) PCT Filed: Oct. 4, 2018

(86) PCT No.: PCT/JP2018/037131
§ 371 (c)(1),
(2) Date: Apr. 2, 2020

(87) PCT Pub. No.: WO2019/070011
PCT Pub. Date: Apr. 11, 2019

(65) Prior Publication Data
US 2020/0259996 A1   Aug. 13, 2020

(30) Foreign Application Priority Data

Oct. 5, 2017   (JP) .............................. JP2017-194958

(51) Int. Cl.
*G06T 7/292* (2017.01)
*H04N 23/611* (2023.01)
(Continued)

(52) U.S. Cl.
CPC .......... *H04N 23/611* (2023.01); *G06T 7/246* (2017.01); *G06T 7/292* (2017.01); *G06V 20/42* (2022.01);
(Continued)

(58) Field of Classification Search
CPC .. H04N 5/23219; H04N 7/18; G06K 9/00724; G06T 7/246; G06T 7/292;
(Continued)

(56) References Cited

U.S. PATENT DOCUMENTS

2015/0016798 A1* 1/2015 Fujimatsu ............... G11B 27/30
386/223
2015/0178943 A1* 6/2015 Li .......................... G06V 20/00
382/103
(Continued)

FOREIGN PATENT DOCUMENTS

| JP | 2007-274543 | 10/2007 |
| JP | 2009-251940 | 10/2009 |

(Continued)

OTHER PUBLICATIONS

Cheng et al., "Multi-view 3D Ball Tracking with Abrupt Motion Adaptive System Model, Anti-occlusion Observation and Spatial Density based Recovery in Sports Analysis", IEICE Trans. Fundamentals, vol. E94-A, No. 1, Jan. 2011, pp. 1-12.
(Continued)

*Primary Examiner* — Stephen P Coleman
(74) *Attorney, Agent, or Firm* — Greenblum & Bernstein, P.L.C.

(57) ABSTRACT

A mobile entity tracking device is provided with: a video receiving unit for receiving a moving-image frame of a ball game captured by each of a plurality of cameras present at different positions; a mobile entity candidate extraction unit for extracting a candidate for a mobile entity using a
(Continued)

plurality of moving-image frames; a mobile entity selection unit for displaying candidates for a mobile entity and accepting selection, by a user, of the mobile entity to be tracked; and a mobile entity tracking unit for tracking the mobile entity that is the object to be tracked. When the mobile entity selection unit accepts selection, by a user, of the mobile entity to be tracked, the mobile entity tracking unit corrects the object to be tracked to the mobile entity selected by the user.

12 Claims, 15 Drawing Sheets

(51) Int. Cl.
*G06T 7/246* (2017.01)
*G06V 20/40* (2022.01)

(52) U.S. Cl.
CPC ............... *G06T 2207/30224* (2013.01); *G06T 2207/30228* (2013.01)

(58) Field of Classification Search
CPC . G06T 2207/30224; G06T 2207/30228; G06T 2207/10024; G06T 2207/20104; G06T 7/254

USPC ...................................................... 348/222.1
See application file for complete search history.

(56) References Cited

U.S. PATENT DOCUMENTS

| | | | |
|---|---|---|---|
| 2015/0248587 A1* | 9/2015 | Oami | H04N 7/181 382/103 |
| 2017/0161913 A1* | 6/2017 | Khazanov | H04N 5/23245 |
| 2018/0322641 A1 | 11/2018 | Ueda | |

FOREIGN PATENT DOCUMENTS

| | | |
|---|---|---|
| JP | 2016-099941 | 5/2016 |
| WO | 2017/081839 | 5/2017 |

OTHER PUBLICATIONS

International Search Report issued in International Pat. Appl. No. PCT/JP2018/037131, dated Dec. 25, 2018.
Extended European Search Report dated Jul. 3, 2020 issued in European Patent Application No. 18864304.3-1209.

* cited by examiner

MOBILE ENTITY TRACKING DEVICE AND METHOD FOR TRACKING MOBILE ENTITY

TECHNICAL FIELD

The present disclosure relates to a moving body tracking device and a method for tracking a moving body.

BACKGROUND ART

In the related art, a device which tracks a moving body for a ball game, such as a ball, by using moving image frames of a ball game captured by cameras at different viewpoints is known. For example, Non-Patent Literature (hereinafter, referred to as "NPL") 1 discloses a multi-view three-dimensional ball tracking system which calculates a three-dimensional (hereinafter, referred to as "3-D") position of a ball by using moving image frames of each viewpoint in which volleyball is captured.

In the technique disclosed in NPL 1, a wrong object may become a tracking target so that ball tracking fails. For example, ball tracking is likely to fail in a case where a ball is blocked or framed-out in moving image frames captured by two cameras out of four cameras, or in a case where a physical body (such as a human head) similar to a ball in a moving image frame is present near the ball, or the like. The user has a need to correct the tracking target in a case where ball tracking fails as described above. In particular in a case where a spare ball captured by accident is wrongly recognized as a ball as a tracking target, it is difficult to automatically correct the failed tracking since the wrongly recognized object (spare ball) has a feature substantially identical to that of the tracking target. Thus, a system which enables the user to easily correct the tracking target has been required.

CITATION LIST

Non-Patent Literature

NPL 1

Xina CHENG, Norikazu IKOMA, Masaaki HONDA and Takeshi IKENAGA "Multi-view 3D Ball Tracking with Abrupt Motion Adaptive System Model, Anti-occlusion Observation and Spatial Density based Recovery in Sports Analysis", IEICE TRANS. FUNDAMENTALS, VOL. E94-A, NO. 1 JAN. 2011

SUMMARY OF INVENTION

Technical Problem

However, NPL 1 does not disclose any means to correct the tracking target.

Non-limiting and exemplary embodiments of the present disclosure facilitate providing a moving body tracking device and a method for tracking a moving body which make it possible to correct a tracking target in a case where tracking of a moving body for a ball game has failed.

Solution to Problem

The moving body tracking device according to an aspect of the present disclosure is a moving body tracking device which tracks a moving body for a ball game, comprising:

a video receiver which receives moving image frames of a ball game captured by each of a plurality of cameras at different positions;

a moving body candidate extractor which extracts a moving body candidate by using the moving image frames;

a moving body selector which displays the moving body candidate and receives selection of a moving body as a tracking target from a user; and a moving body tracker which tracks the moving body as the tracking target, wherein when the moving body selector receives the selection of the moving body as the tracking target from the user, the moving body tracker corrects the moving body as the tracking target to the moving body selected by the user.

Note that, comprehensive or specific embodiments thereof may be realized by a system, a method, an integrated circuit, a computer program, or a recording medium, or may be realized by an arbitrary combination of a system, a method, an integrated circuit, a computer program, and a recording medium.

Advantageous Effects of Invention

According to an aspect of the present disclosure, a tracking target can be corrected in a case where tracking of a moving body for a ball game has failed.

The specification and the drawings reveal additional advantages and effects in an aspect of the present disclosure. Such advantages and/or effects are respectively provided by the features disclosed in several embodiments as well as the specification and the drawings, but do not have to be necessarily all provided in order to obtain one or more identical features.

DESCRIPTION OF EMBODIMENTS

Hereinafter, embodiments of the present invention will be described in detail with reference to the drawings as appropriate. However, a detailed description more than necessary may be omitted, such as a detailed description of an already well-known matter and a duplicate description for a substantially identical configuration, to avoid unnecessary redundancy of the following description and to facilitate understanding by the person skilled in the art.

Note that, the accompanying drawings and the following description are provided for the person skilled in the art to sufficiently understand the present disclosure, and are not intended to limit the subject matter described in the claims.

Further, reference signs such as "camera 3A" and "camera 3B" may be used in a case where a description will be given with a distinction between the elements of the same kind, whereas solely a common number of reference signs, such as "camera(s) 3", may be used in a case where a description will be given without a distinction between the elements of the same kind.

Embodiment 1

<Moving Body Tracking System>

Figure 1:
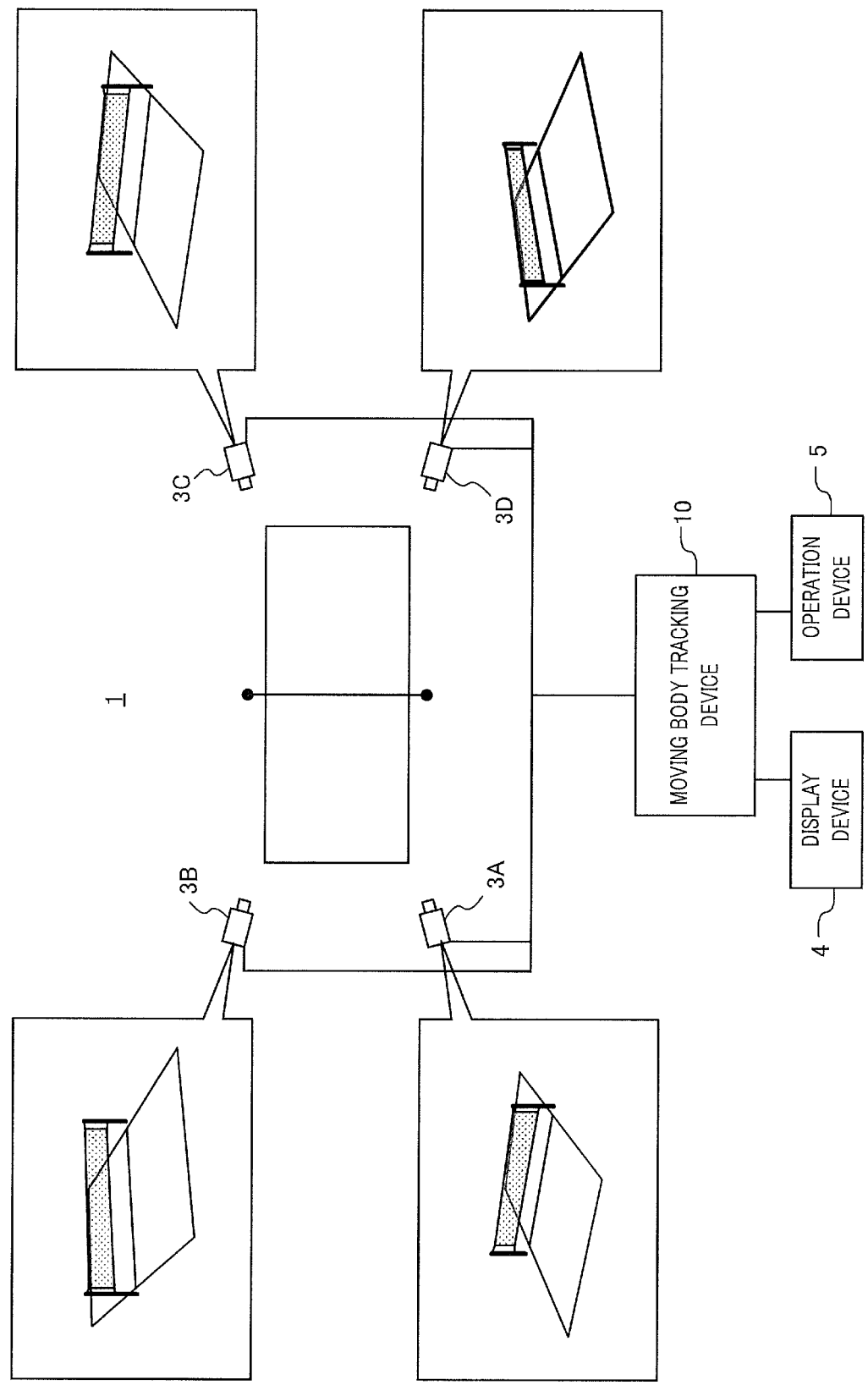
FIG. 1 is a diagram of an outline of a moving body tracking system.

First, an outline of a moving body tracking system will be described with reference to FIG. 1.

Moving body tracking system 1 is a system for tracking a ball which is an example of a moving body for a ball game. In the present embodiment, a description will be given with a ball of volleyball, which is one of ball games, as an example of the moving body. Moving body tracking system 1, however, can be applied to various ball games such as table tennis, basketball, tennis, rugby, American football, and badminton. Further, a moving body to be tracked by moving body tracking system 1 is not limited to a ball, but may also be, for example, a shuttlecock of badminton.

Moving body tracking system 1 includes a plurality of cameras 3, display device 4, operation device 5, and moving body tracking device 10.

The plurality of cameras 3 are installed at different positions, respectively. In the case of volleyball, for example, each camera 3 is installed at a position where the court can be captured at a different viewpoint (view angle) from a high place. Note that, although FIG. 1 exemplifies a case in which the number of cameras 3 is four, the present embodiment is not limited thereto, and the number of cameras 3 may be two or more. The reason why the minimum number of cameras 3 is two is that, as will be described later, moving body tracking system 1 receives an input of a correct tracking target by using a main moving image frame captured by one of cameras 3, and uses the result thereof to extract a candidate image of the same tracking target from the moving image frame captured by another one of cameras 3. Further, each camera 3 is connected to moving body tracking device 10, and transmits to moving body tracking device 10 a moving image frame in which a situation of the ball game is captured. Camera 3 and moving body tracking device 10 may be connected in a wired or wireless manner.

Display device 4 is connected to moving body tracking device 10, and displays an image to be output from moving body tracking device 10. For example, display device 4 is a liquid crystal display device, an organic EL display device or the like.

Operation device 5 is connected to moving body tracking device 10, and inputs operation information by the user to moving body tracking device 10. Examples of operation device 5 include a keyboard, a mouse, a microphone and/or a touch panel. Note that, operation device 5 and display device 4 may be integrated into an integrated device.

Moving body tracking device 10 tracks the ball to be used in the ball game based on the moving image frames captured by each camera 3, and displays the result of the tracking of the ball (for example, ball trajectory) on display device 4.

<Moving Body Tracking Device>

Figure 2:
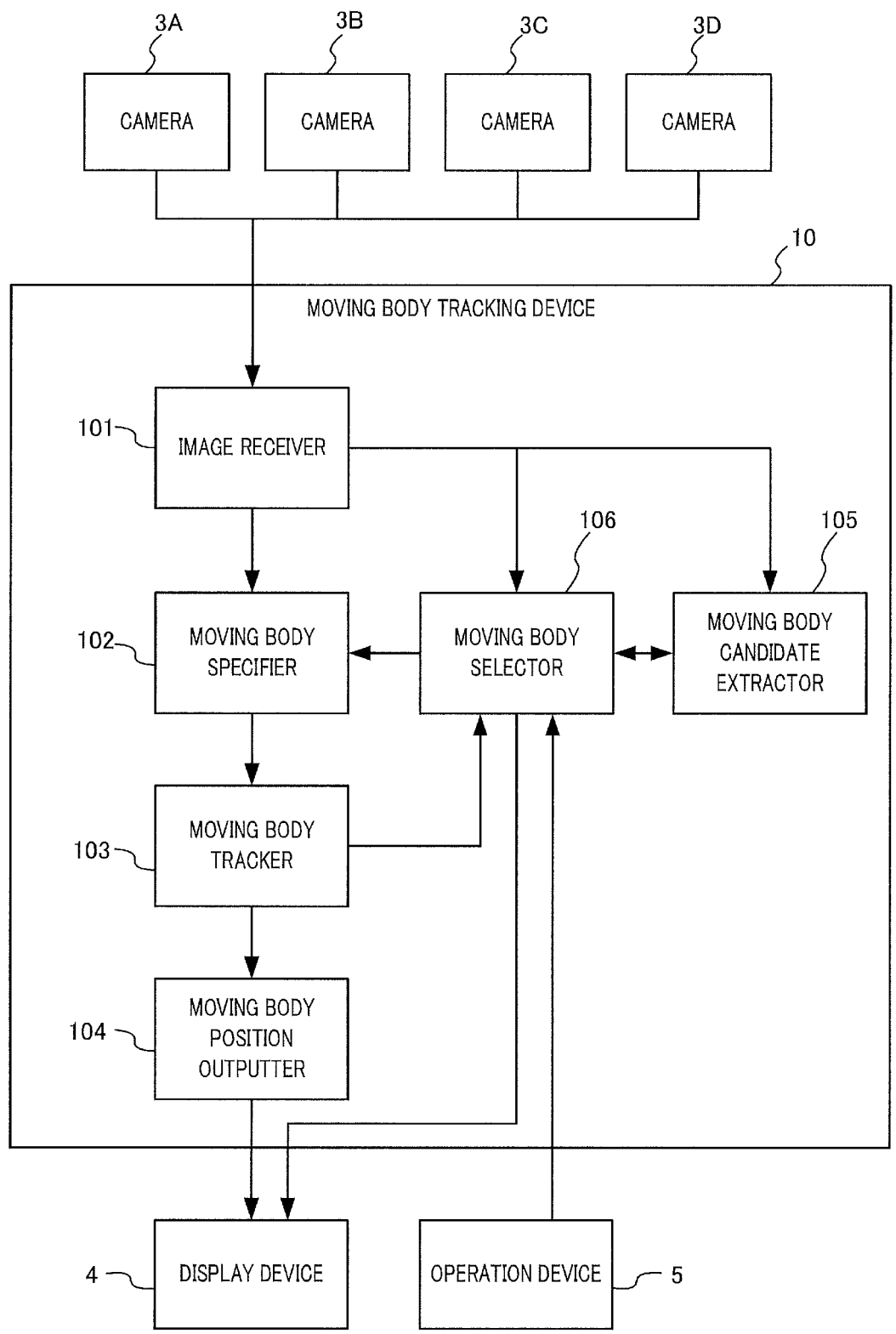
FIG. 2 is a diagram of a configuration example of a moving body tracking device.

Next, details of moving body tracking device 10 will be described with reference to FIG. 2.

Moving body tracking device 10 includes image receiver 101, moving body specifier 102, moving body tracker 103, moving body position outputter 104, moving body candidate extractor 105, and moving body selector 106.

Image receiver 101 receives the moving image frames to be transmitted from each of cameras 3A to 3D, and inputs the transmitted moving image frame to moving body specifier 102 and moving body selector 106. The moving image frame may be, for example, a frame image such as MP4, H.264, H.265, and Motion JPEG.

Moving body specifier 102 specifies an object of the ball as the tracking target based on the moving image frames of each of cameras 3A to 3D input by image receiver 101, and specifies a position of the ball in a three-dimensional space (hereinafter, referred to as "3-D position"). For example, moving body specifier 102 specifies the object and the 3-D position of the ball as the tracking target by the method of NPL 1. Note that, the 3-D position of the ball may be denoted with the coordinates (x, y, z) of the three-dimensional space.

Moving body tracker 103 tracks the 3-D position of the ball specified by moving body specifier 102. That is, moving body tracker 103 records a temporal change in the 3-D position of the ball. For example, moving body tracker 103 tracks the 3-D position of the ball by the method of NPL 1.

Moving body position outputter 104 outputs a tracking result of the 3-D position of the ball (for example, ball trajectory) to display device 4.

Moving body candidate extractor 105 extracts a ball candidate from the moving image frames of each of cameras 3A to 3D input by image receiver 101. The ball candidate is an object which is presumed to be the ball as the tracking target. Note that, details of processing of moving body candidate extractor 105 will be described later (see FIG. 7).

Moving body selector 106 generates UI (hereinafter, referred to as "ball selection UI") 200 (see FIG. 3) for correcting the tracking target, and displays ball selection UI 200 on display device 4. The user can correct the tracking target by operating ball selection UI 200 via operation device 5 in a case where moving body specifier 102 wrongly specifies the tracking target. Note that, details of processing of moving body selector 106 will be described later (see FIGS. 6 and 8).

Moving body selector 106 displays ball selection UI 200, for example, in one of the following cases:

(A1) In a case where the user realizes that the tracking target is wrong, and performs a predetermined operation;

(A2) In a case where moving body candidate extractor 105 cannot extract any ball candidate;

(A3) In a case where each ball candidate extracted by moving body candidate extractor 105 has a likelihood less than a predetermined threshold value. The likelihood of the ball candidate is an index which indicates a possibility that the ball candidate is the correct ball as the tracking target. Note that, details of a method for calculating the likelihood of the ball candidate will be described later; and (A4) In a case where moving body tracker 103 determines that a trajectory of the ball as the tracking target is abnormal. Examples of the case where the ball trajectory is determined as abnormal include a case where a trajectory of the ball as the tracking target largely deviates from a typical trajectory of the ball in volleyball, and/or the like.

<Ball Selection UI>

Next, ball selection UI 200 and an example of use thereof will be described with reference to FIGS. 3 and 4.

Figure 3:
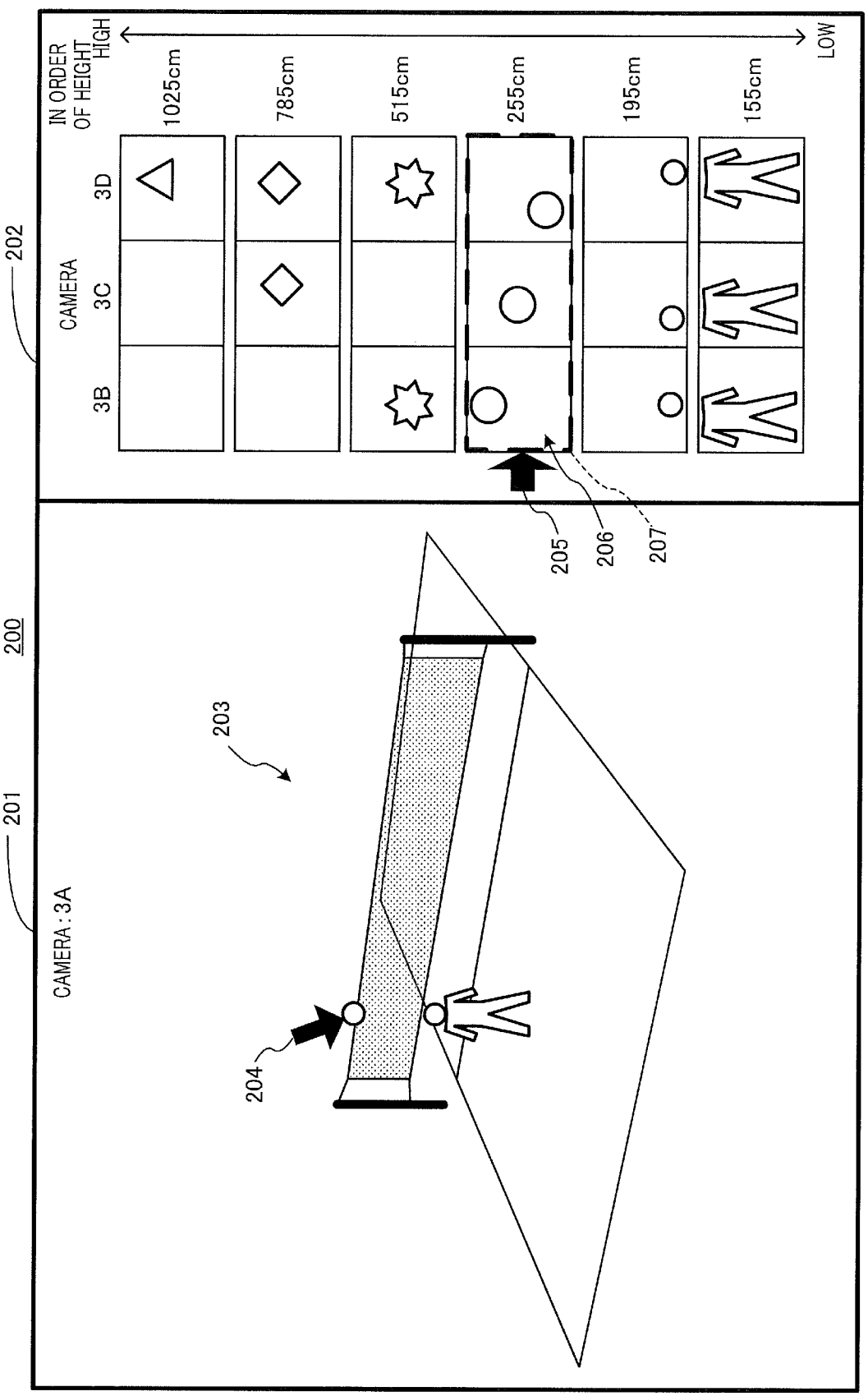
FIG. 3 is a diagram of an example of ball selection UI.
Figure 4:
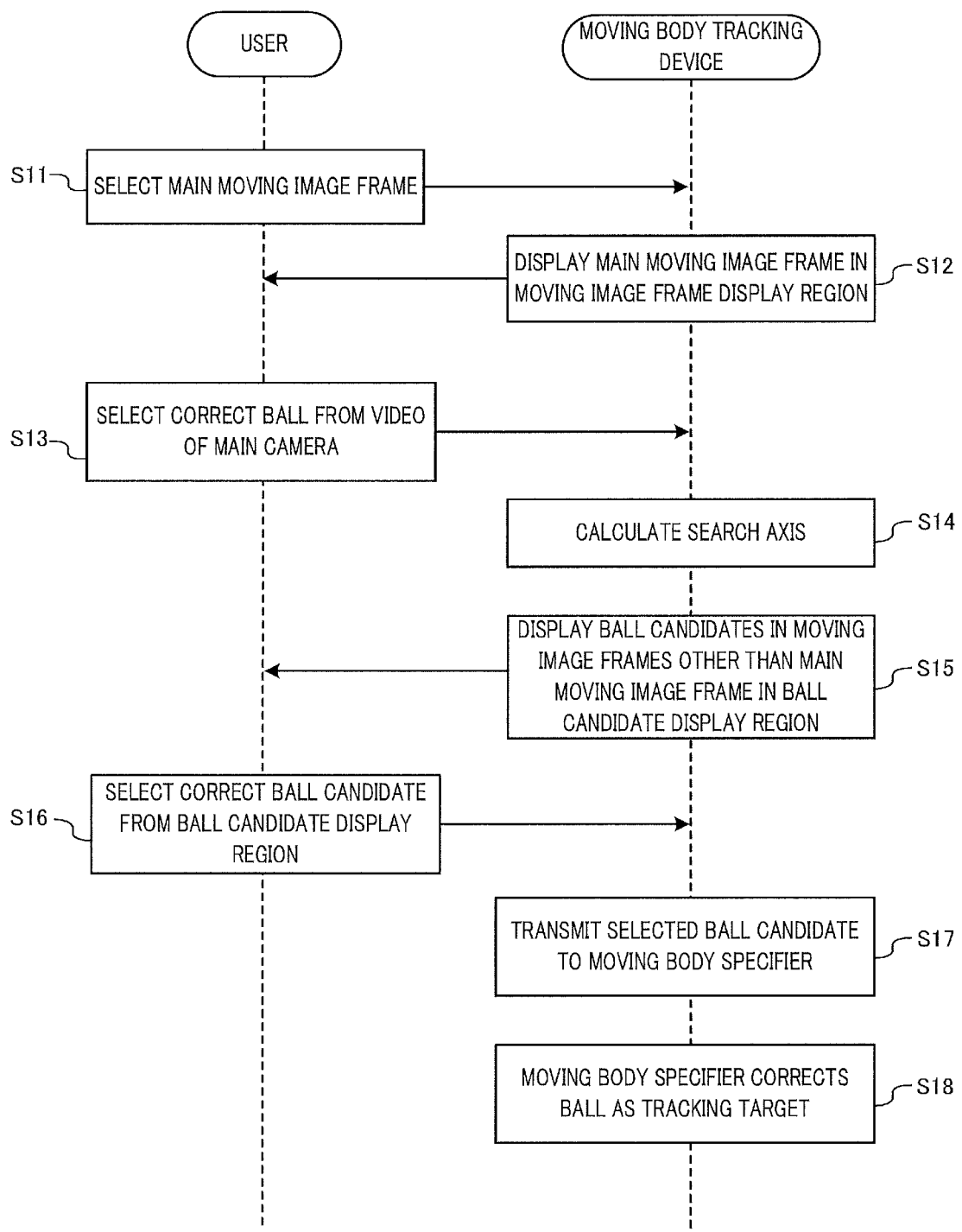
FIG. 4 is a sequence diagram for describing an example of use of ball selection UI.

As illustrated in FIG. 3, ball selection UI 200 includes moving image frame display region 201 and ball candidate display region 202.

Moving image frame display region 201 displays the moving image frame of one of camera 3 selected by the user (hereinafter, referred to as "main moving image frame").

Ball candidate display region 202 displays an image of a ball candidate captured in the moving image frames other than the main moving image frame.

Next, a method for using ball selection UI 200 will be described with reference to FIG. 4.

(S11) The user selects the moving image frame of one of camera 3 in which the ball is captured well from the moving image frames of the respective cameras 3A to 3D. FIG. 3 represents an example in a case where the user selects the moving image frame of camera 3A.

Note that, in a case where the condition for displaying ball selection UI 200 is one of (A2) to (A4) described above, moving body selector 106 may automatically select an optimum main moving image frame based on a 2-D likelihood of a frame before an occurrence of wrong tracking which is judged to occur to the frame. Further, with respect to actual operation of automatic selection, in a case where switching of the screens happens so often, moving body selector 106 may update the main moving image frame to a screen having a high 2-D likelihood at a fixed frame interval, or may automatically switch the main moving image frame to another main moving image frame in a case where the main moving image frame has a 2-D likelihood equal to or lower than a predetermined threshold value. The user who is still unfamiliar with the operation can easily utilize moving body tracking device 10 by turning on a setting for automatically selecting an appropriate main moving image frame as described above.

(S12) Moving body selector 106 displays main moving image frame 203 selected in S11 in moving image frame display region 201.

(S13) The user moves selection cursor 204 to designate (click, touch, or the like) the position of the correct ball as the tracking target in main moving image frame 203 displayed in moving image frame display region 201.

Figure 5:
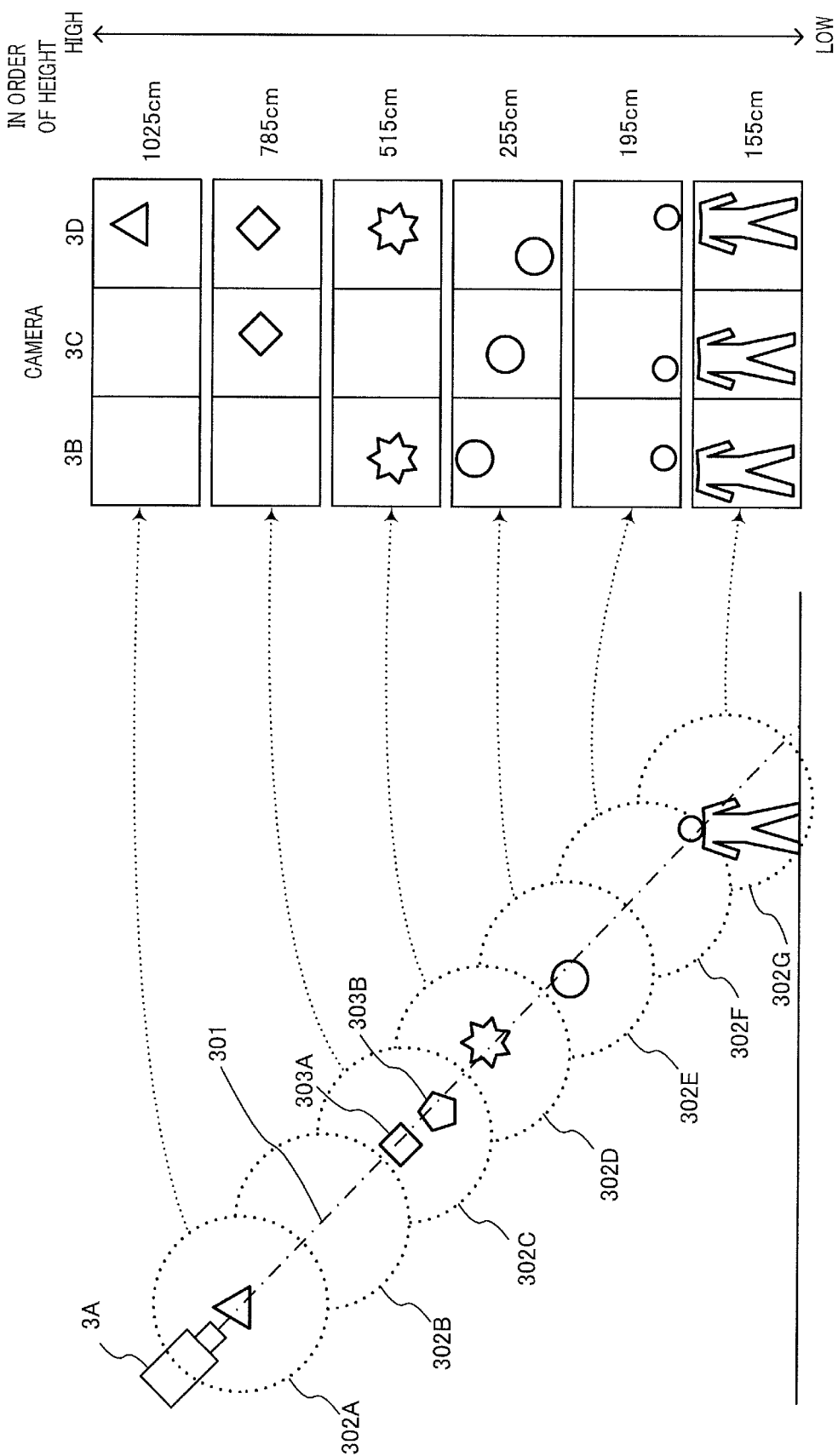
FIG. 5 is a diagram of an example in which ball candidates are displayed in order of height in a ball candidate display region according to Embodiment 1.

(S14) Moving body selector 106 calculates search axis 301 (see FIG. 5) in a 3-D space according to the 2-D position (coordinates) of the correct ball in main moving image frame 203 designated in S13. As illustrated in FIG. 5, search axis 301 is an axial line which connects, the position (coordinates) of camera 3A which captures main moving image frame 203 in the 3-D space, with the positions (coordinates) in the 3-D space corresponding to the 2-D position of the correct ball designated in S13. Note that, the position (coordinates) of camera 3A in the 3-D space may be entered by the user, or may be automatically set from a detection result using a sensor and/or the like.

(S15) Moving body selector 106 extracts a ball candidate image included in each of search ranges 302A to 302G (see FIG. 5) including a point on search axis 301 from the moving image frames other than main moving image frame 203, and displays the extracted ball candidate image in ball candidate display region 202. FIG. 3 represents an example in which ball candidate images 206 extracted from the moving image frames of camera 3B, 3C, and 3D, respectively, is displayed in ball candidate display region 202.

In this case, as illustrated in FIG. 3, moving body selector 106 collectively displays ball candidate images 206 corresponding to the same 3-D position as one group 207 so that ball candidate images 206 which are correct as the tracking target can be selected in group units. Here, a description is given on the premise that ball candidate image 206 corresponding to the same search range 302 is approximate to ball candidate image 206 corresponding to the same 3-D position, but ball candidate image 206 may be analyzed in more detail to calculate an exact 3-D position.

In the example of FIG. 3, no object is shown in ball candidate images 206 captured by part of cameras 3 at heights of 515 cm, 785 cm, and 1025 cm. This is due to the fact that there is a case where no object can be captured owing to the presence of an obstacle and/or the like even when an identical 3-D position is captured. In an actual environment, an object which can be captured by all of cameras 3 is not necessarily the correct ball. For example, the correct ball is not captured in the search range at a height of 155 cm of FIG. 3. Accordingly, in a case where a relatively high likelihood is calculated even when no object is found by some of cameras 3, moving body selector 106 collectively displays ball candidate images 206 at the same 3-D position as correction candidates in group 207. Note that, details of extraction processing of ball candidate images will be described later.

(S16) The user moves selection cursor 205 to select group 207 of ball candidate images 206, which are correct as the tracking target, in ball candidate display region 202.

(S17) Moving body selector 106 outputs information (for example, 3-D coordinates, object ID, or the like) for identifying a ball candidate selected in S16 to moving body specifier 102.

(S18) Moving body specifier 102 corrects the tracking target to the ball candidate output in S17.

As described above, in a case where moving body tracking device 10 makes an error with respect to the tracking target, the user can correct the tracking target to the correct ball by performing two operations shown in S13 and S15 described above for ball selection UI 200.

That is, moving body tracking device 10 groups and presents images (ball candidate images) at the 3-D position of a ball which is highly likely the correct ball based on the position designated in S13. Thus, the user can confirm a ball candidate at the same 3-D position from the viewpoints of the other cameras (cameras 3B and 3C), and can easily judge whether the ball candidate is the correct ball.

Further, moving body tracking device 10 enables the user to collectively designate the 3-D position of the correct ball in cameras 3B and 3C in S15 in group units. Accordingly, moving body tracking device 10 can reduce the user's labor for selecting the correct ball in comparison with a case where the user performs works to visually confirm the correct ball candidate from the entire videos of all of cameras 3 and to designate the 3-D position thereof.

In addition, moving body tracking device 10 can extract and display images around a correction candidate having a high likelihood as ball candidate images 206 and, as will be described later, can align an order of display of ball candidate images 206 which have been extracted. Accordingly, the user who utilizes moving body tracking device 10 can easily confirm a correction candidate.

Further, in a case where no operation is performed for a certain time (S16) and ball display is based on an order of likelihood described later, moving body selector 106 may automatically select a candidate having the highest 3-D likelihood. Thus, the user's operational burden can be expected to be reduced, and the user can quickly move to the next operation in the case of solely one candidate. That is, in a case where moving body tracking device 10 fails to track, the user can correct the tracking target easily (in a short time).

Moving body selector 106 can rearrange ball candidate images 206 to be displayed in ball candidate display region 202 under various conditions. Next, a method for displaying ball candidate images 206 side by side in order of height of 3-D position will be described.

<Example of Displaying Ball Candidates in Order of Height>

Next, an example of displaying ball candidate images in order of height in ball candidate display region 202 will be described with reference to FIG. 5.

Moving body selector 106 extracts ball candidate images captured in each of search ranges 302A to 302G including points on search axis 301 from the moving image frames captured at different viewpoints from a viewpoint of the main moving image frame. For example, as illustrated in FIG. 5, moving body selector 106 extracts ball candidates from a plurality of search ranges 302A to 302G, respectively, whose centers on search axis 301 are set to differ from each other in the height direction with respect to each moving image frame other than the main moving image frame, and displays images of the extracted ball candidates side by side in order of height of 3-D position of the ball. Further, moving body selector 106 collectively displays a group of images of a ball candidate in the moving image frames of the respective cameras 3, in which the ball candidate is extracted from the same search range 302 and in which the same object presumed to be the ball candidate is captured in the images.

Note that, moving body selector 106 may extract one ball candidate from one of search ranges 302. For example, in FIG. 5, two ball candidates 303A and 303B are present in one search range 302C so that moving body selector 106 extracts one of the ball candidates, which is ball candidate 303A having a higher likelihood, and displays ball candidate 303A in ball candidate display region 202. Thus, the number of candidates to be displayed can be limited to a number of those which have a high likelihood so that the user's labor for confirmation can be reduced.

Further, both ball candidates 303A and 303B may be extracted as ball candidates. For example, in a case where both ball candidates 303A and 303B have a higher likelihood than a ball candidate in any other search range 302, the correct ball candidate can be extracted more likely by extracting both of the ball candidates than extracting either of the ball candidates.

<Processing Flow for Displaying Ball Candidates in Order of Height>

Next, an example of processing of displaying ball candidates in order of height of 3-D position in ball candidate display region 202 will be described with reference to the flowcharts of FIGS. 6 to 8. This processing is executed after the user designates the position of the correct ball as the tracking target (that is, executing S13 in FIG. 4) in the main moving image frame.

First, moving body selector 106 calculates search axis 301 in the 3-D space, which corresponds to the 2-D position of a ball selected from the main moving image frame (S101).

Next, moving body selector 106 sets a search axis height (variable) to 0 (initial value) (S102). The search axis height corresponds to a position of height of a center point of search range 302.

Next, moving body selector 106 judges whether the search axis height is less than a predetermined maximum height reached by the ball (S103). The maximum height reached by the ball varies depending on ball game events. In the case of volleyball, for example, the rules make it necessary to ensure that the height from the court to the ceiling is 12.5 m or higher. That is, this value is used since the maximum height reached by the ball assumed by the rules of the ball game is 12.5 m. Note that, although the maximum height reached by the ball may be a height higher than the height assumed by the rules, the higher the maximum height reached by the ball is set, the longer the processing takes. Accordingly, it is preferable to use the height in accordance with the rules as the maximum height reached by the ball from a viewpoint of a balance between the processing speed and the tracking range. Further, in a case where it is impossible to capture an image so as to include the maximum height reached by the ball in the image, moving body selector 106 may calculate the maximum height reached by the ball within a range which can be captured by calibration or the like to use the value of the calculated the maximum height.

In a case where the search axis height exceeds the maximum height reached by the ball (S103: NO), moving body selector 106 executes processing of displaying secondary ball candidates in order of height (S110). Note that, details of the processing of displaying secondary ball candidates in order of height will be described later (see FIG. 8).

In a case where the search axis height is less than the maximum height reached by the ball (S103: YES), moving body candidate extractor 105 executes primary ball candidate extraction processing (S104) in search range 302 corresponding to the search axis height. Note that, although primary ball candidate extraction processing will be described later (see FIG. 7), the processing calculates the 3-D likelihood of a primary ball candidate included in search range 302 corresponding to the search axis height in each loop processing (S103 to S109).

Next, moving body selector 106 judges whether a ball candidate having a 3-D likelihood exceeding a first threshold value (hereinafter, the ball candidate will be referred to as "secondary ball candidate") is present among primary ball candidates (S105). Note that, the first threshold value varies depending on the capturing environment. For example, the first threshold value may be set based on an average value of 3-D likelihood values obtained whenever ball tracking succeeds in a capturing environment. Thus, it is possible to exclude a moving body which is unlikely to be the correct tracking target. That is, it is possible to restrain an inappropriate candidate as a correction candidate from being extracted.

In a case where no secondary ball candidate is present (S105: NO), moving body selector 106 proceeds to processing in S109.

In a case where a secondary ball candidate is present (S105: YES), moving body selector 106 judges whether a plurality of secondary ball candidates are present (S106).

In a case where solely one secondary ball candidate is present (S106: NO), moving body selector 106 proceeds to processing in S108.

In a case where a plurality of secondary ball candidates are present (S106: YES), moving body selector 106 selects a secondary ball candidate having the highest 3-D likelihood (S107), and proceeds to processing in S108.

Moving body selector 106 stores the 3-D coordinates of a secondary ball candidate in a ball candidate table (not illustrated). Further, moving body selector 106 extracts an image of a portion in which a secondary ball candidate is captured (hereinafter, the image will be referred to as "ball candidate image") from each moving image frame other than the main moving image frame, and stores the ball candidate image in the ball candidate table (S108).

Next, moving body selector 106 adds a predetermined value a to the search axis height (S109), and returns to S103. The predetermined value a may be set such that search ranges 302 corresponding to search axis heights different from each other partially overlap with each other. For example, the predetermined value a may be a value corresponding to the radius of a ball. In the case of volleyball, the ball for the game has a diameter of 21 cm, and the predetermined value a is therefore approximately 11 cm.

With the processing described above, a secondary ball candidate is extracted from each search range 302 up to the maximum height reached by the ball, and is stored in the ball candidate table.

Next, an example of the primary ball candidate extraction processing (S104) in FIG. 6 will be described with reference to the flowchart of FIG. 7.

Figure 6:
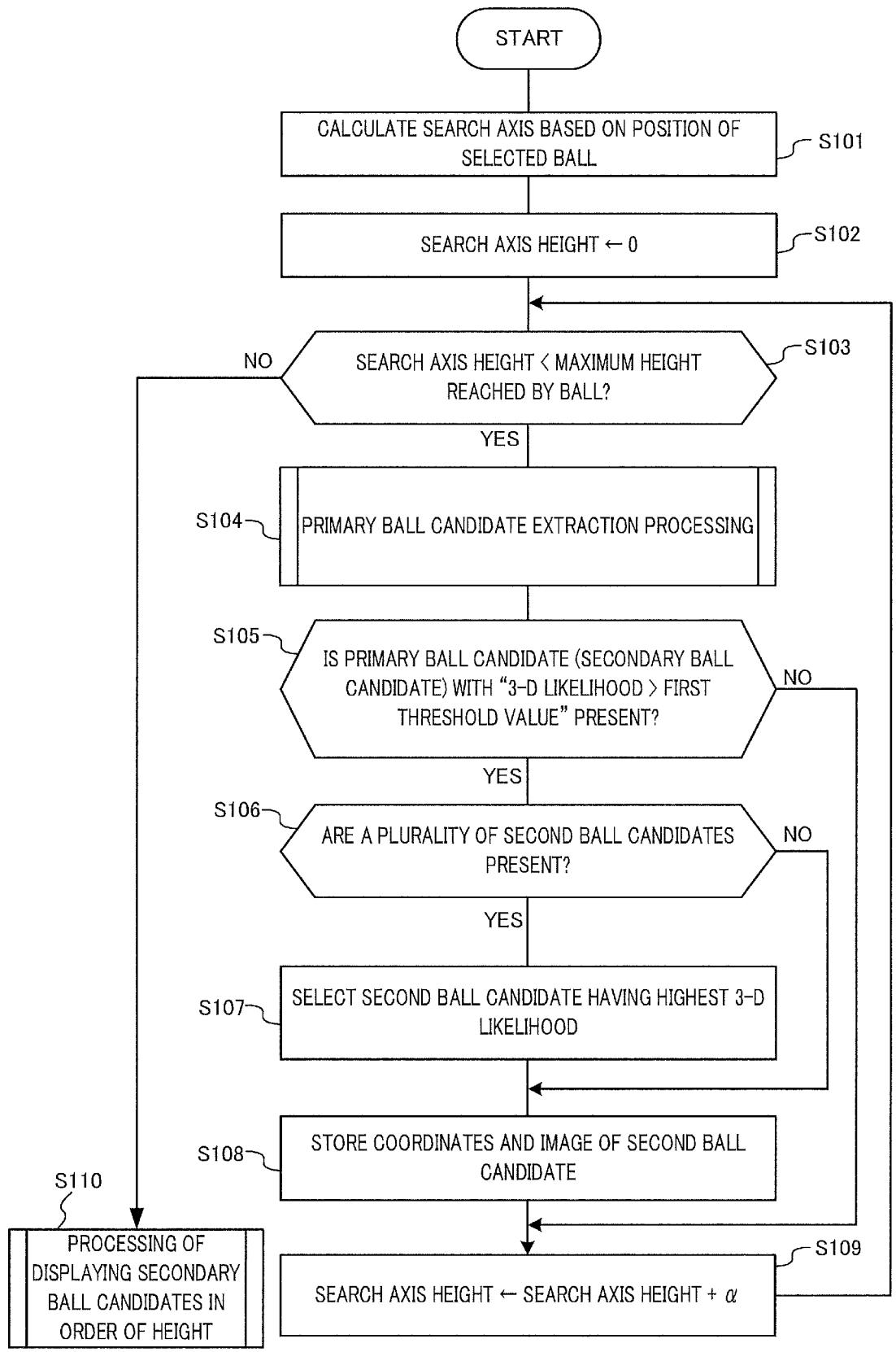
FIG. 6 is a flowchart of processing in which the ball candidates are displayed in order of height in the ball candidate display region according to Embodiment 1.
Figure 7:
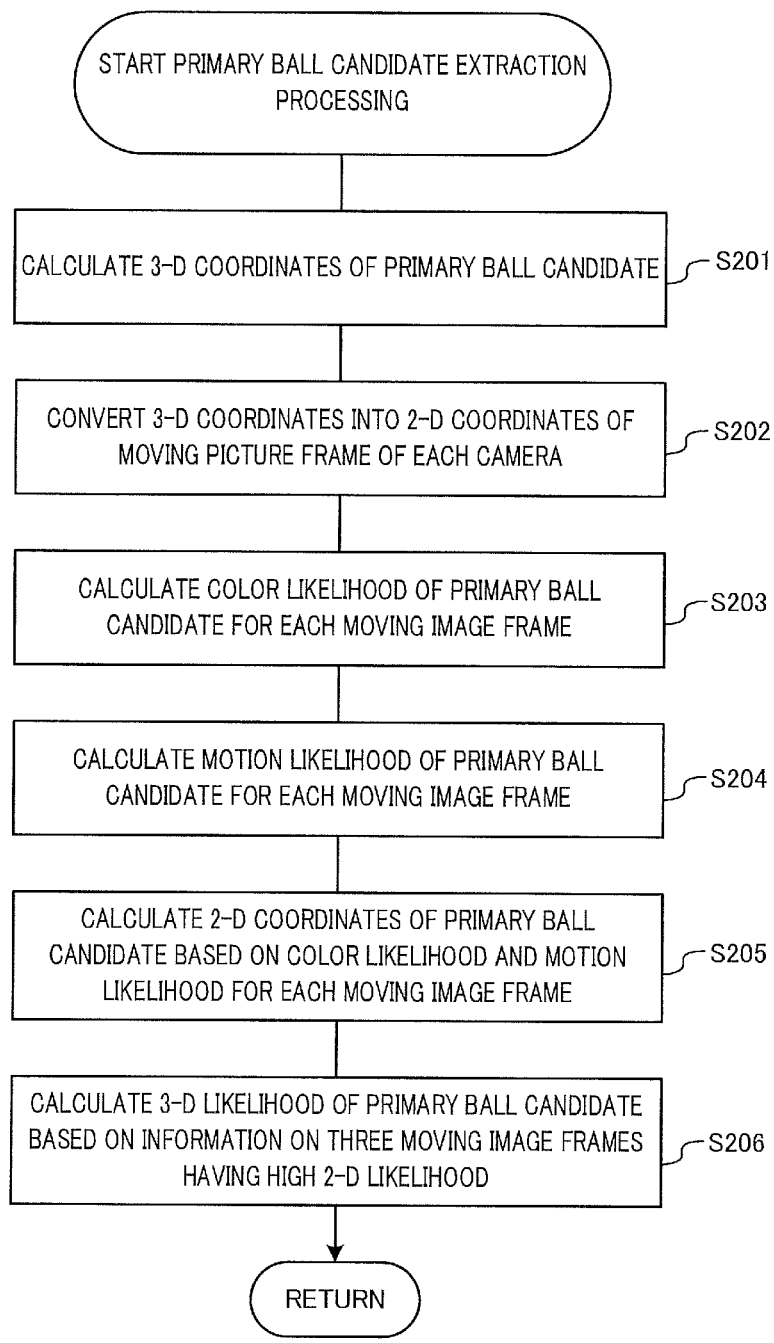
FIG. 7 is a flowchart of an example of primary ball candidate extraction processing according to Embodiment 1.

First, moving body candidate extractor 105 calculates the 3-D coordinates of a primary ball candidates included in search range 302 corresponding to the search axis height in loop processing (S103 to S109) of FIG. 6 (S201).

Next, moving body candidate extractor 105 converts the 3-D coordinates of the primary ball candidate to the 2-D coordinates in each moving image frame of four cameras 3A, 3B, 3C, and 3D (S202).

Next, moving body candidate extractor 105 calculates a numerical value obtained by converting a ball hue likelihood of the primary ball candidate (hereinafter, the numerical value will be referred to as "color likelihood") by using a predetermined sample image in each moving image frame of four cameras 3A, 3B, 3C, and 3D (S203). Note that, the color likelihood is calculated by using a sample image of the correct ball since the color and pattern of the ball to be used vary depending on the types of games, the intention of sports event organizers, and/or the like. For example, the color likelihood is calculated by calculating color histograms and comparing the histograms of the ball candidate and the sample image.

Next, moving body candidate extractor 105 calculates a numerical value obtained by conversion based whether a physical body has moved on 2-D coordinates corresponding to a primary ball candidate by using a difference from a past frame image (for example, a previous frame image), a difference from a background image, or a difference in motion from a dynamic background model whose characteristic motion is eliminated by using a plurality of frame images in each moving image frame of four cameras 3A, 3B, 3C, and 3D (hereinafter, the numerical value will be referred to as "motion likelihood") (S204).

Next, moving body candidate extractor 105 calculates a likelihood of a primary ball candidate in each moving image frame (hereinafter, the likelihood will be referred to as "2-D likelihood") by using the color likelihood calculated in S203 and the motion likelihood calculated in S204 in each moving image frame (S205).

Next, moving body candidate extractor 105 specifies three moving image frames out of four moving image frames in descending order of 2-D likelihood, integrates information on the three specified moving image frames, and calculates the likelihood of the primary ball candidate in the 3-D coordinates (hereinafter, the likelihood will be referred to as "3-D likelihood") (S206). For example, moving body candidate extractor 105 multiplies and normalizes the 2-D likelihoods of the three specified moving image frames to calculate the 3-D likelihood.

Note that, the calculation method of the 3-D likelihood is not limited to the method described above. For example, the priority when calculating the 3-D likelihood may vary depending on the 2-D likelihoods of each camera 3. As an example, in a case where camera 3A has a very high 2-D likelihood and camera 3B has a relatively low 2-D likelihood, moving body candidate extractor 105 may perform weighting when executing the multiplication and the normalization so that the 2-D likelihood of camera 3A is preferentially reflected in the 3-D likelihood over the 2-D likelihood of camera 3B.

In the above calculation method, information on moving image frames from three cameras in descending order of 2-D likelihood is used for the calculation of the 3-D likelihood. However, information on moving image frames from two cameras in which the 2-D likelihood exceeds a predetermined threshold value may be used for the calculation of the 3-D likelihood. Here, the reason why the information from two cameras is used to calculate the 3-D likelihood is that the calculation of the 3-D position requires information from at least two cameras. In a case where numerous cameras are present, the 3-D likelihood may be calculated by using information from not solely two or three cameras, but more cameras. Further, in a case where the number of cameras in which the 2-D likelihood exceeds the predetermined threshold value is less than two, the 3-D likelihood of a primary ball candidate present in search range 302 may be considered as zero. It is due to the fact that information from a camera in which the 2-D likelihood is low must be used when calculating the 3-D position in a case where the number of cameras in which the 2-D likelihood is less than the threshold value is less than two since the calculation of the 3-D position requires information from at least two cameras as described above.

Further, there are various conceivable methods for calculating the 3-D likelihood, such as reflecting both the threshold value and the weighting. As will be described later, the 3-D likelihood is used to narrow down or rank ball candidates present in search range 302, and therefore any method for calculating the 3-D likelihood is possible as long as it is possible to obtain a result which can be evaluated by the same criteria among search ranges 302.

With the processing described above, the 3-D likelihood is calculated for each primary ball candidate present in search range 302 corresponding to the search axis height.

Next, an example of the processing of displaying secondary ball candidates in order of height (S110) in FIG. 6 will be described with reference to the flowchart of FIG. 8.

First, moving body selector 106 judges whether the number of secondary ball candidates exceeds a predetermined number of N (N is one or more integers) (S301).

In a case where the number of secondary ball candidates is N or less (S301: NO), moving body selector 106 proceeds to S303.

In a case where the number of secondary ball candidates is more than N (S301: YES), moving body selector 106 leaves N secondary ball candidates in descending order of 3-D likelihood in the ball candidate table, and excludes the other secondary ball candidates from the ball candidate table (S302).

Next, moving body selector 106 rearranges secondary ball candidate images remaining in the ball candidate table in descending order of height in the height direction (z-axis direction) of the 3-D coordinates, and displays the rearranged secondary ball candidate images in ball candidate display region 202 (S303).

With the processing described above, N or fewer secondary ball candidate images are displayed side by side in descending order of height in the height direction of the 3-D coordinates in ball candidate display region 202.

Note that, as a method other than the above, the number of ball image candidates may not be narrowed down to N, and all ball image candidates may be displayed. With respect to the capturing environment, there is a risk that the correct ball candidate may be lost when the number of ball image candidates is narrowed down to N in a case where numerous similar physical bodies are present, and therefore all ball image candidates may be displayed.

Further, N is a value for setting an upper limit on the number of candidates to be displayed in ball candidate display region 202. An appropriate value of N varies depending on various factors, such as the size and resolution of ball candidate display region 202, or such as the skill level of the user who performs the correction. Accordingly, the value of N does not have to be a fixed value, but may be a value which can be changed at any time according to the user's instruction or the like.

Effects of Embodiment 1

In Embodiment 1, moving body tracking device 10 displays the main image frame in moving image frame display region 201, and displays ball candidate images 206 extracted from the image frames other than the main image frame side by side in order of height of 3-D position in ball candidate display region 202. Further, when the user designates the position of the correct ball as the tracking target in the main image frame and selects ball candidate image 206 which is correct as the tracking target from ball candidate images 206 arranged in order of height of 3-D position, moving body tracking device 10 corrects the tracking target to the selected ball candidate.

Thus, the user can easily correct the tracking target solely by performing operations in moving image frame display region 201 and ball candidate display region 202. Further, the user can quickly search for ball candidate image 206 which is correct as the tracking target in ball candidate display region 202 with reference to the height of the ball. Accordingly, the user can quickly correct an error in the tracking target made by moving body tracking device 10.

Embodiment 2

In Embodiment 2, an example of displaying ball candidates in order of likelihood will be described. Note that, in Embodiment 2, the points different from those in Embodiment 1 will be described, and a description of the points which are common to those in Embodiment 1 will be omitted.

<Displaying Ball Candidates in Order of Likelihood>

First, an example of displaying ball candidates in order of likelihood in ball candidate display region 202 will be described with reference to FIG. 9.

Figure 9:
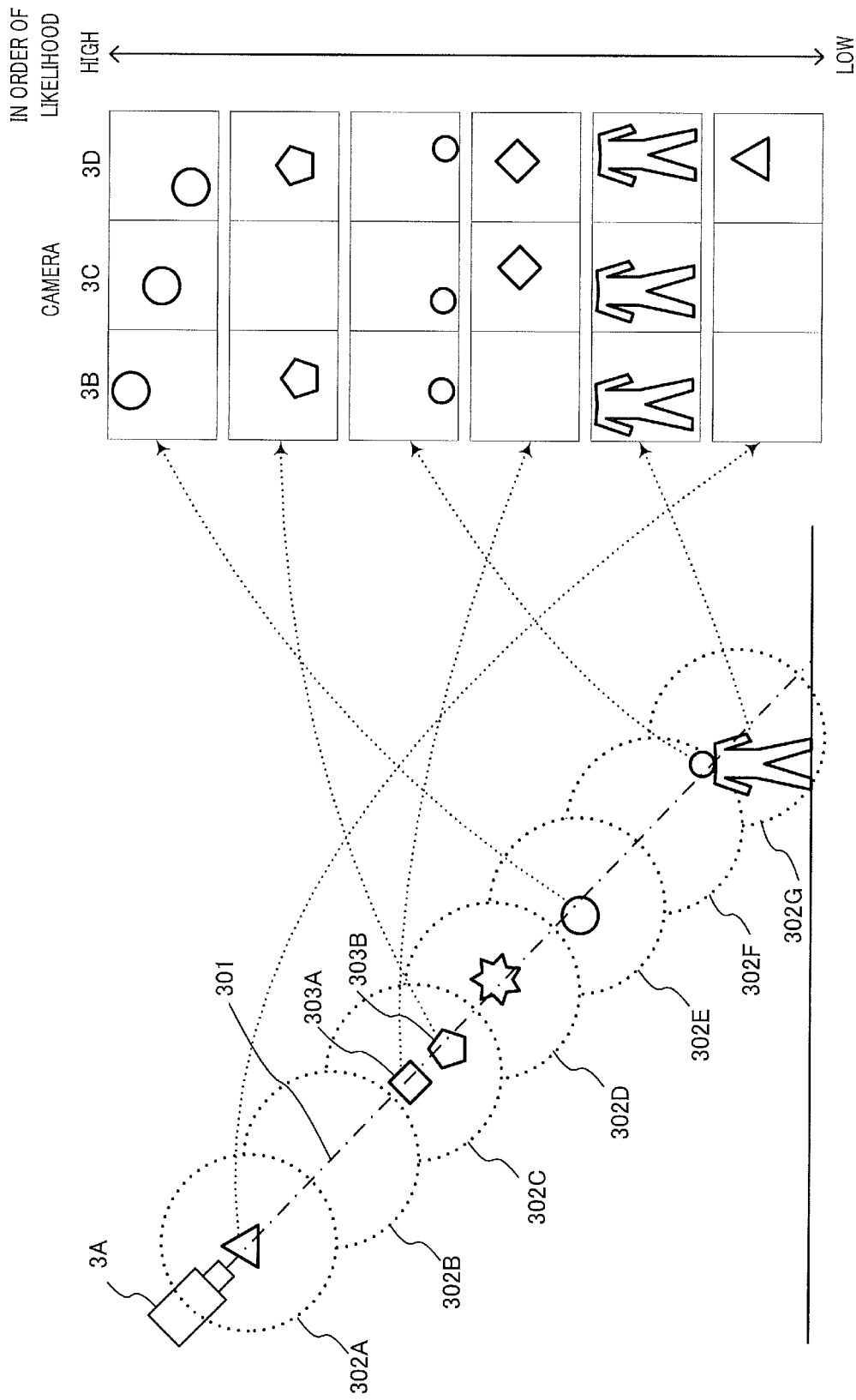
FIG. 9 is a diagram of an example in which the ball candidates are displayed in order of likelihood in the ball candidate display region according to Embodiment 2.

As illustrated in FIG. 9, moving body selector 106 respectively extracts ball candidates from a plurality of search ranges 302 whose centers on search axis 301 are set to differ from each other in the height direction with respect to each moving image frame other than the main moving image frame, and displays images of the extracted ball candidates side by side in descending order of 3-D position of the ball in ball candidate display region 202.

In the above case, moving body selector 106 extracts a predetermined number of ball candidates in descending order of 3-D likelihood from search ranges 302A to 302G in their entirety. For example, ball candidates 303A and 303B are present in one search range 302C in FIG. 9. In this case, when the 3-D likelihoods of each of ball candidates 303A and 303B are high in comparison with the 3-D likelihood of any other ball candidate, moving body selector 106 displays images of both ball candidates 303A and 303B in ball candidate display region 202, which differs from the case in FIG. 5.

<Processing Flow of Displaying Ball Candidates in Order of Likelihood>

Next, processing of displaying ball candidates in order of likelihood in ball candidate display region 202 will be described with reference to the flowcharts of FIGS. 10 and 11. As with the case in FIG. 6, this processing is executed after the user designates the position of the correct ball as the tracking target (that is, the user has executed S13 in FIG. 4) in the main moving image frame.

Figure 10:
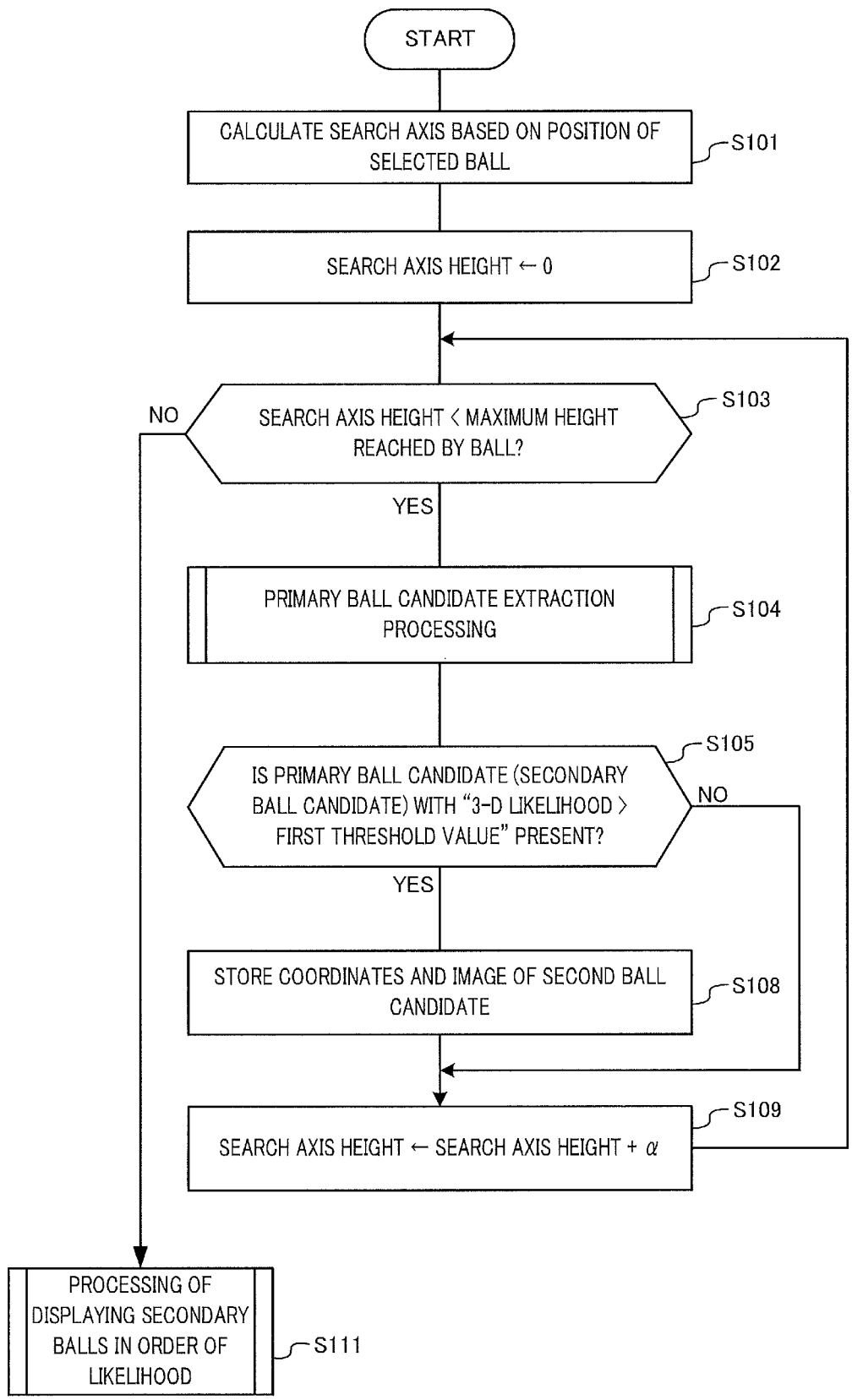
FIG. 10 is a flowchart of processing in which the ball candidates are displayed in order of likelihood in the ball candidate display region according to Embodiment 2.

The processing in FIG. 10 is the same as the processing in FIG. 6 except processing in a case where the search axis height is equal to or greater than the maximum height reached by the ball (S103: NO) and processing in a case where a secondary ball candidate is present (S105: YES). Accordingly, each different processing will be described below.

In a case where the search axis height is equal to or greater than the maximum height reached by the ball (S103: NO), that is, in a case where secondary ball candidate extraction is completed, moving body selector 106 executes processing of displaying secondary ball candidates in order of likelihood (S111). Note that, a description of the processing of displaying secondary ball candidates in order of likelihood will be described later (see FIG. 11).

Further, in a case where a secondary ball candidate is present (S105: YES), moving body selector 106 performs the same processing as in S108 of FIG. 6, and proceeds to S109. That is, in comparison with FIG. 6, FIG. 10 involves storing every secondary ball candidate having a 3-D likelihood exceeding the first threshold value in the ball candidate table without being limited to one secondary ball candidate in search range 302 corresponding to the search axis height.

With the processing described above, the secondary ball candidate having a 3-D likelihood exceeding the first threshold value is extracted from each search range 302 up to the maximum height reached by the ball, and is stored in the ball candidate table.

Next, the processing of displaying secondary ball candidates in order of likelihood (S111) in FIG. 10 will be described with reference to the flowchart of FIG. 11.

Figure 8:
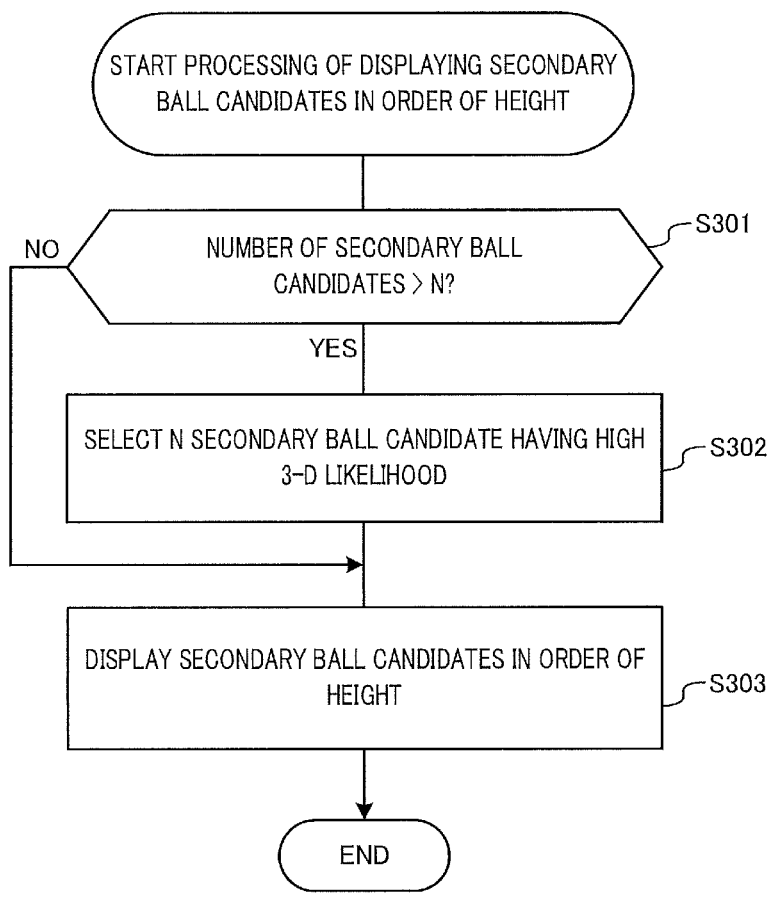
FIG. 8 is a flowchart of an example of processing of displaying secondary ball candidates in order of height according to Embodiment 1.

Instead of the processing of S303 in FIG. 8, moving body selector 106 executes the following processing. That is, moving body selector 106 rearranges secondary ball candidate images stored in the ball candidate table in descending order of 3-D likelihood, and displays the rearranged secondary ball candidate images in ball candidate display region 202 (S304).

With the processing described above, N or fewer secondary ball candidate images are displayed side by side in descending order of 3-D likelihood in ball candidate display region 202.

Effects of Embodiment 2

In Embodiment 2, moving body tracking device 10 displays the main image frame in moving image frame display region 201, and displays ball candidate images extracted from the image frames other than the main image frame side by side in descending order of 3-D likelihood in ball candidate display region 202. Then, when the user designates the position of the correct ball as the tracking target in the main image frame and selects the correct ball candidate image as the tracking target from the ball candidate images arranged in descending order of 3-D likelihood, moving body tracking device 10 corrects the tracking target to the selected ball candidate.

Thus, the user can quickly search for the correct ball candidate image as the tracking target in ball candidate display region 202 with reference to the likelihood of the ball. Accordingly, the user can quickly correct an error in the tracking target made by moving body tracking device 10.

Embodiment 3

In Embodiments 3, an example of reducing the number of displayed ball candidates by using a ball trajectory in the moving image frames in the embodiments hitherto will be described. Note that, in Embodiment 3, the points different from those in Embodiment 2 will be described, and a description of the points which are common to those in Embodiment 2 will be omitted.

<Display by Reducing the Number of Displayed Ball Candidates by Using the Ball Trajectory>

First, an example of reducing the number of displayed ball candidates by using the ball trajectory and displaying the same in ball candidate display region 202 will be described with reference to FIG. 12.

Moving body selector 106 limits search range 302 in the moving image frames in the present embodiment by using a ball trajectory to be calculated by using the moving image frames in the embodiments hitherto. For example, a plurality of ball candidates are present in search ranges 302A to 302G in FIG. 12. Since the ball draws dropping trajectory 501 in the moving image frames in the embodiments hitherto, moving body selector 106 limits the search range to search ranges 302C, 302D and 302E located in an area where the ball drops in the moving image frames in the present embodiment. Further, in the same manner as Embodiment 2, moving body selector 106 displays ball candidate images 206 included in the limited search ranges 302C, 302D and 302E side by side in descending order of 3-D likelihood in ball candidate display region 202.

Figure 12:
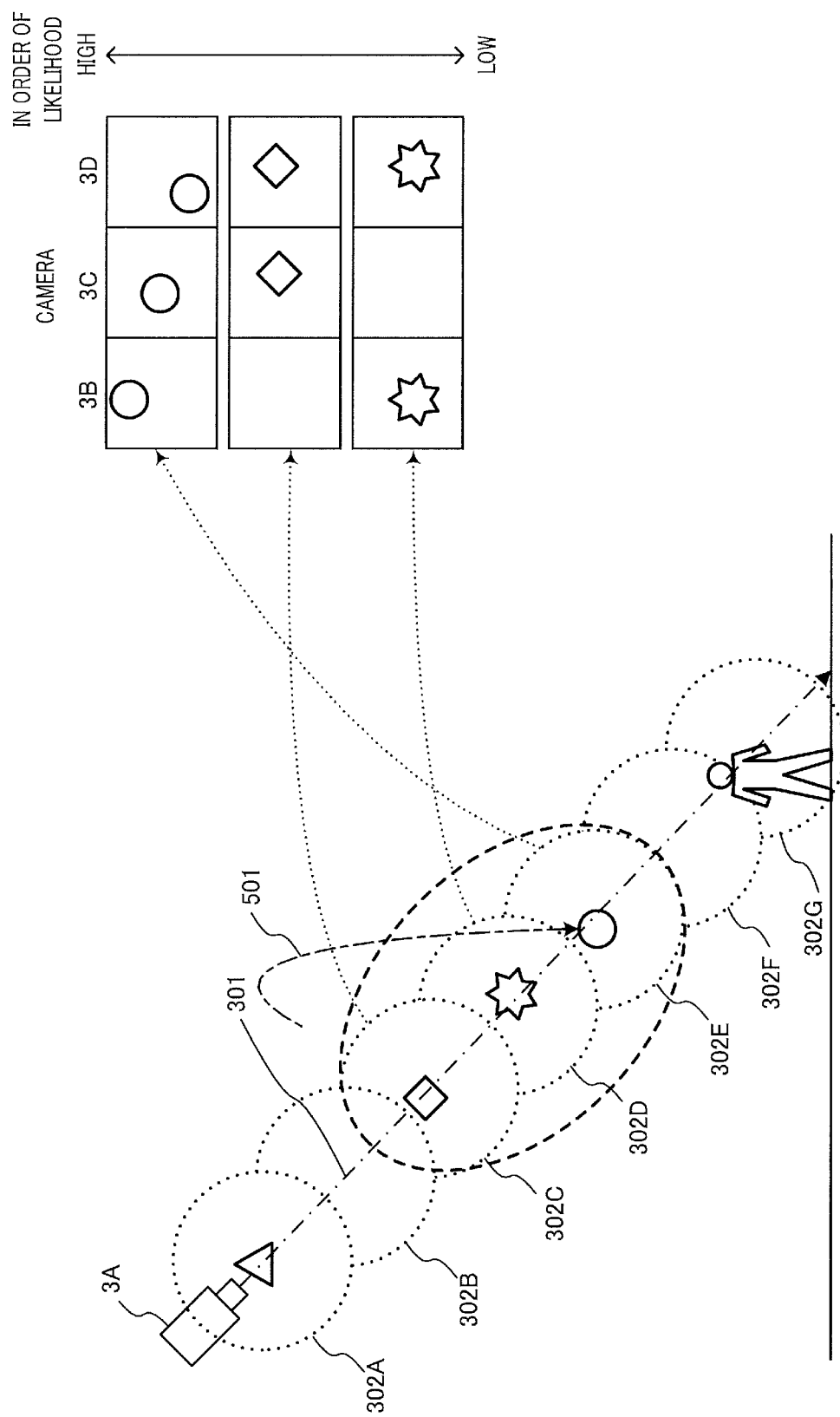
FIG. 12 is a diagram of an example of reducing a number of displayed ball candidates by using a ball trajectory according to Embodiment 3.

Thus, as illustrated in FIG. 12, the number of ball candidate images to be displayed in ball candidate display region 202 decreases in comparison with FIG. 9 so that the user can search for the correct ball candidate as the tracking target more quickly (in short time).

<Processing Flow for Displaying Ball Candidates by Reducing the Number of Displayed Ball Candidates by Using the Ball Trajectory>

Next, an example of processing of displaying ball candidates in ball candidate display region 202 by reducing the number of ball candidates by using the ball trajectory will be described with reference to the flowchart of FIG. 13.

Figure 11:
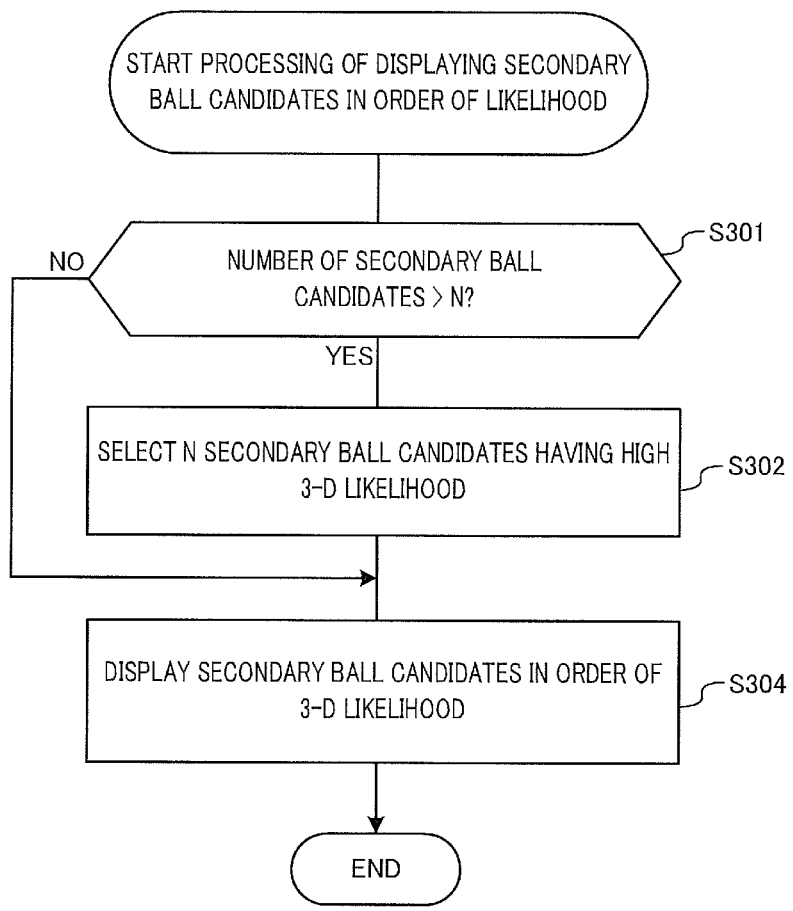
FIG. 11 is a flowchart of an example of processing of displaying secondary ball candidates in order of likelihood according to Embodiment 2.
Figure 13:
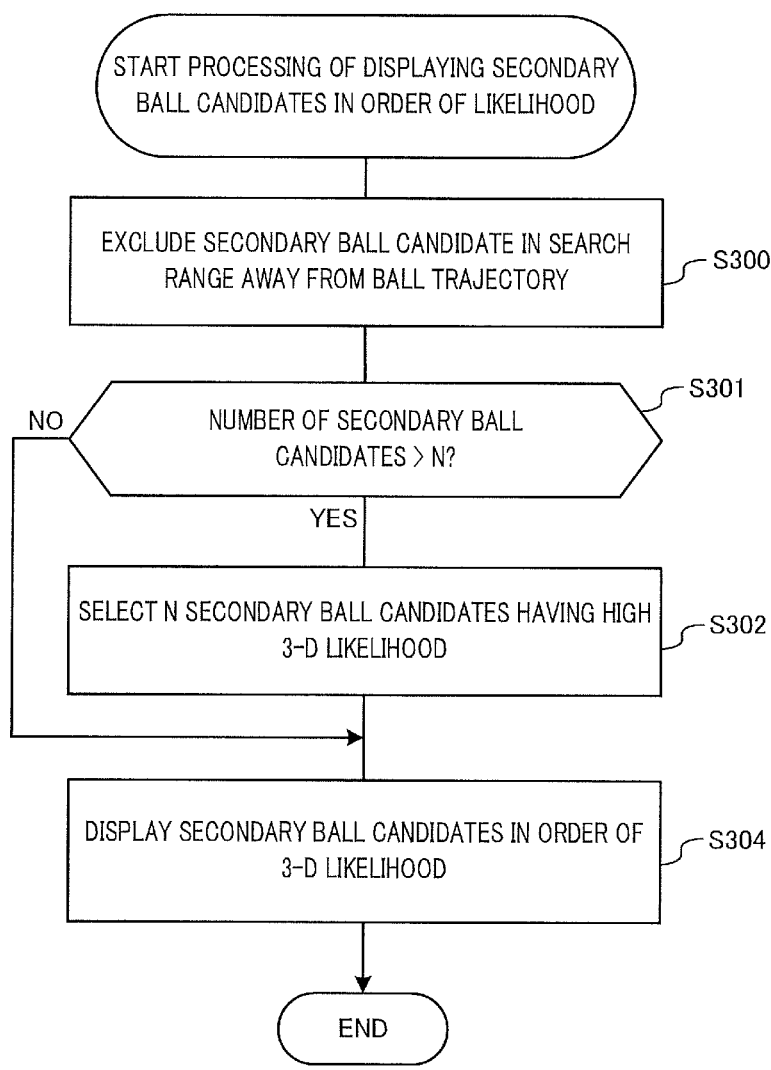
FIG. 13 is a flowchart of an example of processing of reducing the number of displayed ball candidates by using the ball trajectory according to Embodiment 3.

FIG. 13 differs from FIG. 11 in that the following processing is executed prior to processing of S301. That is, moving body selector 106 calculates an estimated position of the ball in the moving image frames in the present embodiment based on the ball trajectory calculated by using the moving image frames in the embodiments hitherto, and excludes secondary ball candidates, which are included in search range 302 away by a predetermined distance or longer from the calculated estimated position of the ball, from the ball candidate table (S300).

With the processing described above, a small number of secondary ball candidate images in comparison with FIG. 9 are displayed side by side in descending order of 3-D likelihood in ball candidate display region 202.

Modification Example of Embodiment 3

Note that, although the above description describes the processing of reducing the number of displayed ball candidates by using the ball trajectory at the stage of selecting the secondary ball candidate images to be displayed in ball candidate display region 202, the number of displayed ball candidates may be reduced by using the ball trajectory at another stage. For example, moving body selector 106 may exclude search range 302, which is away by a predetermined distance or longer from the estimated position of the ball in the moving image frames in the present embodiment, from search range 302 which is subjected to the primary ball candidate extraction processing (S104) in FIG. 10. Thus, the number of loop processing (S103 to S109) in FIG. 10 can be reduced.

Further, although moving body tracking device 10 displays ball candidate images side by side in descending order of 3-D likelihood in the same manner as Embodiment 2 in FIG. 12, moving body tracking device 10 may also display ball candidate images side by side in descending order of 3-D position in the same manner as Embodiment 1.

Further, although search range 302 away by a predetermined distance or longer from the ball trajectory is excluded from the subject of the ball extraction processing in S300 of FIG. 13, moving body tracking device 10 may also set search range 302 based on the ball trajectory. When the ball trajectory can be accurately tracked, the ball is highly likely near an intersection point of the trajectory (also including the estimated position in the moving image frames in the present embodiment) and search axis 301. Thus, setting search range 302 including the above intersection point makes it more possible that ball candidates can be extracted accurately.

Further, although search range 302 away by a predetermined distance or longer from the ball trajectory is excluded from the subject of the ball extraction processing in S300 of FIG. 13, moving body tracking device 10 may also exclude a ball candidate at a 3-D position away by a predetermined distance or longer from the ball trajectory from the subject to be displayed after performing the ball extraction processing for each search range 302. In this case, the number of the loop processing (S103 to S109) in FIG. 10 does not decrease since the ball candidate away by a predetermined distance or longer from the ball trajectory is also extracted. However, it is not necessary to perform recalculation in a case where the display contents are switched to those in which the trajectory is not considered. That is, when switching the display contents, the result of the ball extraction processing for each of search range 302 can be reutilized, which is useful in a situation where it is difficult to predict the trajectory, for example, when tracking a rugby ball immediately before bouncing off the ground.

Further, the processing of excluding a ball candidate at a 3-D position away by a predetermined distance or longer from the ball trajectory from the subject to be displayed is not limited to the processing of step S300 in FIG. 13. For example, e.g. when the closer the distance between the trajectory and search range 302, the greater weight is added to the 3-D likelihood of a found ball candidate, a ball candidate close to the trajectory can be left in the processing of step S302 even by omitting the processing of step S300. Further, in this case, even a ball candidate away from the trajectory remain as the subject to be displayed when the ball candidate has a high 3-D likelihood. Accordingly, even in a case where the trajectory is difficult to predict, there is an increased possibility that the correct ball candidate can be extracted.

Effects of Embodiment 3

In Embodiment 3, moving body tracking device 10 displays the main image frame in moving image frame display region 201, narrows down ball candidate images extracted from the image frames other than the main image frame based on the ball trajectory to be calculated based on the moving image frames in the embodiments hitherto, and displays the ball candidates side by side in descending order of 3-D likelihood in ball candidate display region 202.

Thus, the user can quickly search for the correct ball candidate as the tracking target from a small number of ball candidate images. Accordingly, the user can quickly correct an error in the tracking target made by moving body tracking device 10.

Although some embodiments have been described thus far, moving body tracking device 10 may have functions according to two or more of these embodiments. For example, moving body tracking device 10 may have functions according to Embodiments 1 to 3, and a display method-switching button for switching between the displays of ball candidates in order of height and in order of likelihood in ball candidate display region 202 or for reducing the number of displayed ball candidates in ball candidate display region 202 by using the ball trajectory may be provided in ball selection UI 200 illustrated in FIG. 3.

Figure 14:
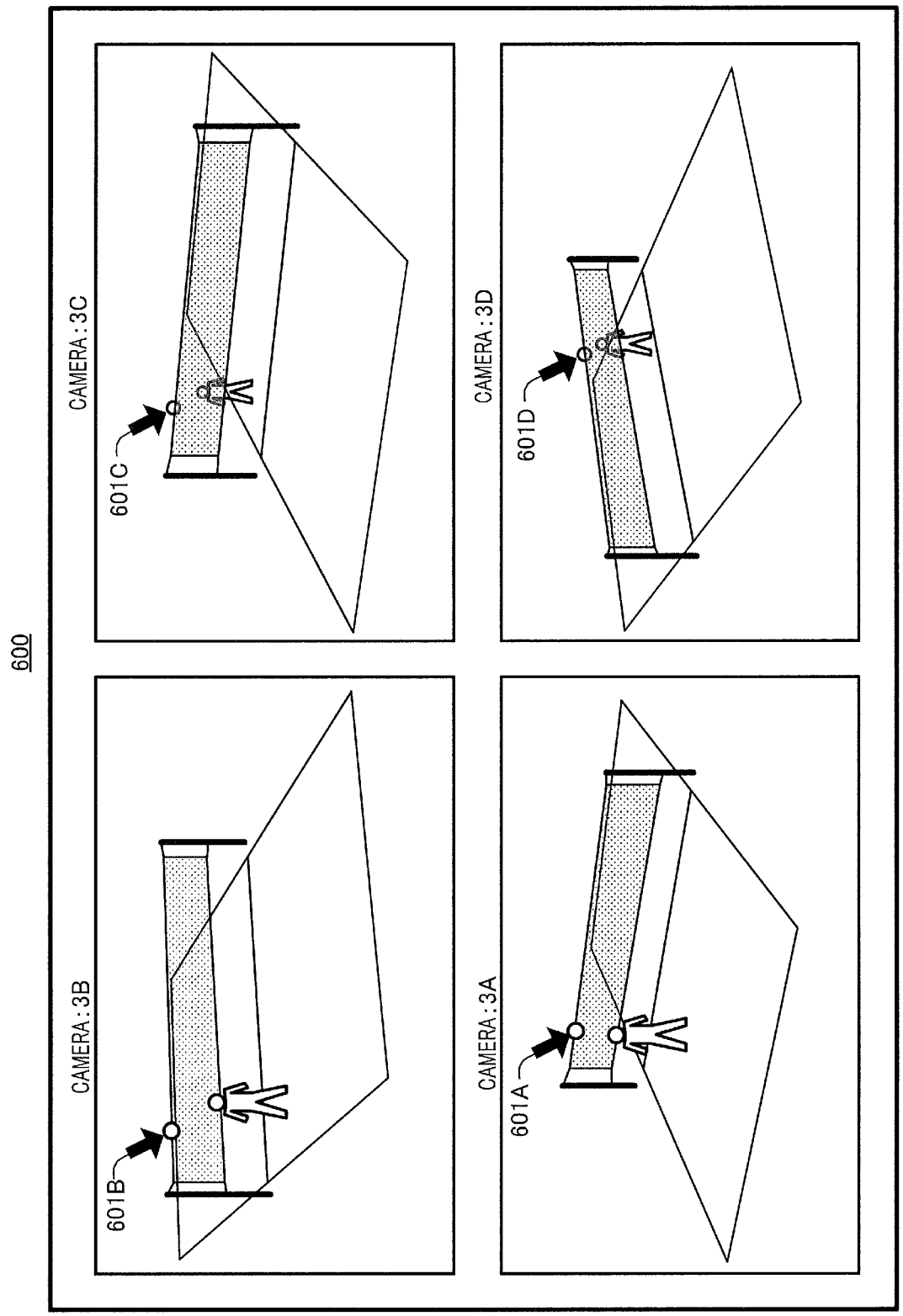
FIG. 14 is a diagram of an example of UI which selects a ball from movie image frames of each camera.

Further, as illustrated in FIG. 14, moving body tracking device 10 may also display the moving image frames of each of cameras 3A to 3D side by side to provide multi-screen selection UI600 for selecting the correct ball as the tracking target. For example, when the user operates selection cursors 601A, 601B, 601C, and 601D in each moving image frame of multi-screen selection UI600 to designate (click) the position of the ball as the tracking target, moving body tracking device 10 can recognize the correct ball as the tracking target. This method is not suitable for quick correction because a great deal of labor is required for the user's operation in comparison with the method in the embodiments described above, but enables moving body tracking device 10 to recognize the ball as the tracking target with high accuracy. Accordingly, ball selection UI 200 illustrated in FIG. 3 may be provided with a recognition method-switching button for switching to multi-screen selection UI600 illustrated in FIG. 14. Further, when the user presses the recognition method-switching button in a case where no correct ball candidate image as the tracking target is present in ball candidate display region 202 due to, for example, a large deflection of the ball or the like, moving body tracking device 10 may display multi-screen selection UI600 illustrated in FIG. 14.

Although volleyball has been described as an example in each embodiment described above, moving body tracking device 10 can be applied to other ball games as well. The ball games mentioned here also include those which use a ball having a special shape as in rugby, and a moving body other than a ball as in badminton, hockey or the like. Further, the ball games also include those which have a strong playing aspect, such as air hockey. That is, the ball games in the present specification refer to games competing for e.g. the number of points to be obtained by moving a moving body by predetermined rules, and the moving body as the tracking target does not necessarily have a spherical shape.

Further, each embodiment described above provides a plurality of search ranges based on the difference in height, but may also provide a plurality of search ranges based on the difference in depth or horizontal direction. For example, in a case where a ball game, such as bowling or curling, in which a moving body moves in a defined plane is captured from substantially the same height as that of the plane, the height of the search axis is substantially constant. As a result, providing a search range itself becomes difficult when based on the difference in height. In this case, it is useful to set a search range on a basis different from the height. A detailed explanation of an operation in a case where a search range is provided based on the difference in depth or horizontal direction will be omitted because such a detail explanation can be obtained by just reading the height as depth, horizontal position, or the like in each embodiment described above.

In each embodiment described above, the color likelihood and the motion likelihood are given as examples for the calculations of the 2-D likelihood and the 3-D likelihood, but any other likelihood such as the form likelihood may be used as well. In the case of volleyball, the form likelihood can be calculated by evaluating whether a ball-sized circular body is present in the moving image frames, or the like.

Further, although the 2-D likelihood is calculated by using a plurality of kinds of likelihoods in each embodiment described above, one kind of likelihood may also be used. In this case, the accuracy of the calculation result of the likelihood decreases, but the load of calculation processing is reduced and it is therefore useful in a case where moving body tracking device 10 is configured with a low-spec computer and/or the like.

Further, the likelihoods mentioned in each embodiment described above are nothing but exemplary. The likelihoods in each embodiment described above are merely criteria for narrowing down the secondary ball candidates and for rearranging the order of display in Embodiments 2 and 3. That is, the same processing may also be performed by using any likelihood different from each of the form, color, and motion likelihoods as long as reliable result can be obtained.

In each embodiment described above, the search ranges are set by a procedure in which the search axis is calculated, and the search ranges are defined around each of a plurality of points on the search axis. However, a variety of other methods are conceivable as the method for setting the search ranges. For example, the search range can also be set by a procedure in which, when designation of the position is received from the user, a range including the position and having a width of the predetermined value a is set in the main moving image frame, and a columnar region in the three-dimensional space corresponding to the range is specified and divided (while being superimposed). In this case, the search range does not have a spherical shape, but a shape obtained by dividing the columnar region perpendicular to the axis. That is, any way for defining the search range can be adopted as long as it is possible to set in the three-dimensional space a range which is projected in the vicinity of the position designated by the user in the main moving image frame.

Although a spherical range having a radius a is set as the search range in each embodiment described above, the search range does not necessarily have a spherical shape. For example, in a game such as bowling or curling in which the motion of the moving body does not involve height or in which the movement with a difference in height of the moving body is small, there is a possibility that the amount of calculation can be reduced without much degradation of accuracy by narrowing the width of the search range in the height direction. Further, it is also possible to consider using a non-spherical search range depending on how to set the search range, as in the aforementioned search range obtained when the columnar region is divided perpendicular to the axis. That is, the search range may have any shape as long as the moving body is highly likely to be included within the search range and unless the amount of calculation becomes unrealistic.

Although the presence or absence of a ball candidate is evaluated for each of a plurality of search ranges in each embodiment described above, the presence or absence of a ball candidate may also be evaluated for one search range. For example, in a case where a specific point in the vicinity of which the moving body is present can be predicted on the search axis with high accuracy, the correct tracking target can be highly likely found solely by evaluating one search range including the point. As a specific example of such a situation, it is possible to consider e.g. a case where the search range is set based on the intersection point of the ball trajectory and the search axis as in a modification example of Embodiment 3. Note that, in a case where solely one search range is used, it is desirable to set the search range to be wider than the size of the moving body so that the position of the moving body can be included in the search range even when the position of the moving body is slightly different from the predicted position.

In each embodiment described above, the moving image for tracking the moving body may have been already recorded, or may be captured and played back in real time. Either case enables a quick correction since the moving body as the tracking target can be easily corrected according to each embodiment described above. Further, in a case where a moving image captured in real time is used, the moving image may be temporarily stopped during correction for facilitating correction work and may be fast-forwarded after completion of the correction to follow the actual scene.

In each embodiment described above, the tracking target may not be limited to the moving body such as a ball, but may be applied to tracking of a human such as a player. Different from the case of a ball, the height limit for human movement is low so that the amount of calculation can also be reduced by narrowing the search range.

Further, the functions of moving body tracking device 10 which have been described in the embodiments described above can also be realized by a computer program.

Figure 15:
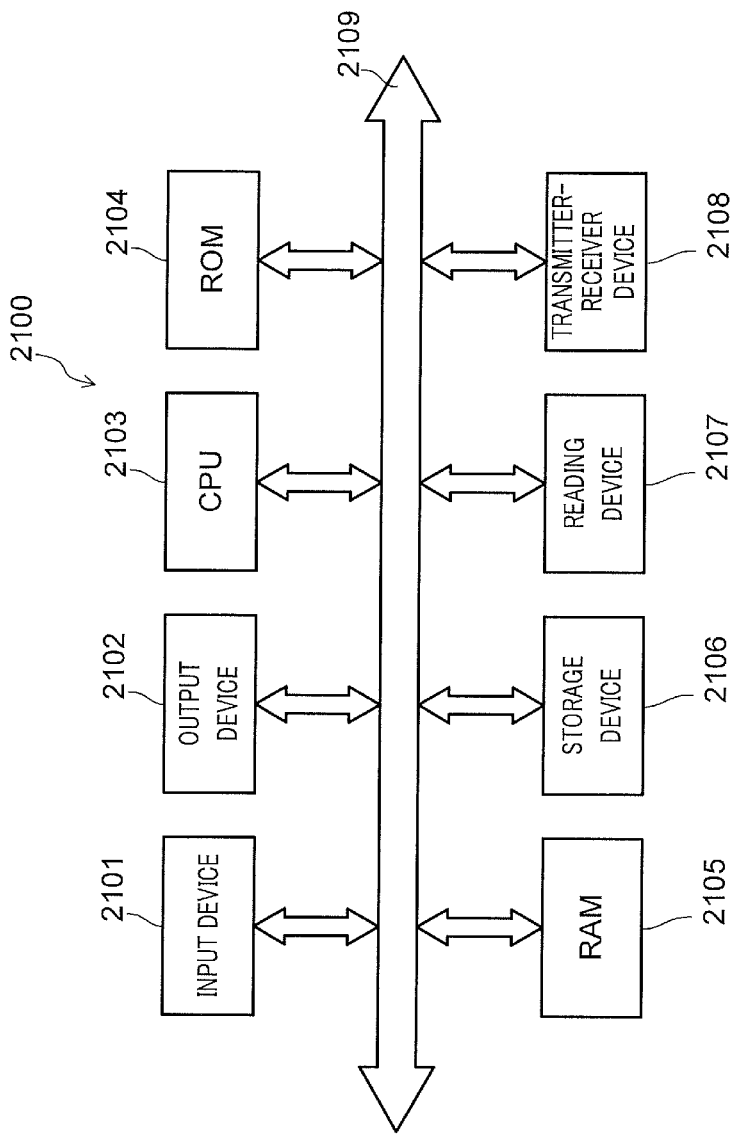
FIG. 15 is a diagram of an example of a hardware configuration according to an embodiment of the present disclosure.

FIG. 15 is a diagram of a hardware configuration of a computer which realizes the functions of moving body tracking device 10 by a program. Computer 2100 here includes input device 2101 (equivalent to operation device 5) such as a keyboard, a mouse and a touch pad; output device 2102 (corresponding to display device 4) such as a display and a speaker; CPU (Central Processing Unit) 2103; ROM (Read Only Memory) 2104; RAM (Random Access Memory) 2105; storage device 2106 such as a hard disk device and a SSD (Solid State Drive); reading device 2107 which reads information from a recording medium such as a DVD-ROM (Digital Versatile Disk Read Only Memory) and a USB (Universal Serial Bus) memory; and transmitter-receiver device 2108 which communicates via a network. Each section is connected by bus 2109.

Further, reading device 2107 reads a program for realizing the functions of each device described above from the recording medium on which the program is recorded, and stores the program in storage device 2106. Alternatively, transmitter-receiver device 2108 communicates with a server device connected to the network, and stores the program for realizing the functions of each device described above downloaded from the server device in storage device 2106.

Further, CPU 2103 copies the program stored in storage device 2106 to RAM 2105, and sequentially reads instructions included in the program from RAM 2105 and executes the instructions so as to realize the functions of each device described above.

Each functional block used in the description of the embodiments described above is typically realized as an LSI which is an integrated circuit. These functional blocks may be individually formed on one chip, or may be partly or wholly included on one chip. The LSI here may be referred to as an IC, a system LSI, a super LSI, or an ultra LSI depending on the difference in degree of integration.

Further, the method for implementing an integrated circuit is not limited to the LSI, and may also be realized with a dedicated circuit or a general-purpose processor. After the production of the LSI, an FPGA (Field Programmable Gate Array) which is programmable or a reconfigurable processor in which connections and settings of circuit cells in the inside of the LSI are reconfigurable may also be utilized.

Further, when a technology for implementing an integrated circuit which substitutes the LSI emerges by the advancement of semiconductor technology or by any other derivative technology, the functional blocks may be integrated by using the above technology as a matter of course. Biotechnology is possibly applied or the like.

The present patent application claims priority based on Japanese Patent Application No. 2017-194958, filed on Oct. 5, 2017, and the entire contents of Japanese Patent Application No. 2017-194958 are incorporated herein by reference.

INDUSTRIAL APPLICABILITY

The present invention can be applied to a moving body tracking device which detects and tracks a moving body from a video in which a sports game is captured.

REFERENCE SIGNS LIST

1 Moving body tracking system
3A, 3B, 3C, 3D Camera
4 Display device
5 Operation device
10 Moving body tracking device
101 Image receiver 102 Moving body specifier
103 Moving body tracker
104 Moving body position outputter
105 Moving body candidate extractor
106 Moving body selector
200 Ball selection UI

The invention claimed is:

1. A moving body tracking device which tracks a moving body for a ball game, the moving body tracking device comprising:
a video receiver which receives moving image frames of a ball game captured by each of a plurality of cameras at different positions;
a moving body selector which
displays a moving image frame captured by one of the cameras, and
receives, from a user, a designation of a position of a moving body selected as a tracking target in the moving image frame captured by the one of the cameras;
a moving body candidate extractor which
extracts a plurality of moving body candidates which is present in a region of a three-dimensional space, the region of the three-dimensional space being formed of a search range that changes according to the designated position in the moving image frame captured by the one of the cameras, and
extracts an image of each of the plurality of moving body candidates from a portion of a moving image frame captured by another camera, the portion corresponding to the region of the three-dimensional space; and
a moving body tracker which tracks the moving body as the tracking target, wherein
the moving body selector displays the moving body candidate images in order of height of position of each of the plurality of moving body candidates in the three-dimensional space and receives the selection of the tracking target,
when the moving body selector receives the selection of the tracking target from the user, the moving body tracker corrects the moving body as the tracking target to the moving body selected by the user.

2. The moving body tracking device according to claim 1, wherein:
the moving body selector further displays the moving body candidate images in order of likelihood of each of the plurality of moving body candidates being the moving body selected as the tracking target.

3. The moving body tracking device according to claim 1, wherein:
the moving body candidate extractor extracts the plurality of moving body candidates from moving image frames of each of the plurality of cameras,
the moving body selector further displays the moving body candidate images by grouping, the moving body candidate images extracted from the moving image frames of each of the plurality of cameras, and
the moving body candidate images corresponding to a same position in the three-dimensional space.

4. The moving body tracking device according to claim 1, wherein:
the moving body candidate extractor extracts the plurality of moving body candidates from moving image frames of each of the plurality of cameras,
the moving body selector groups the moving body candidate images, and
the moving body candidate images correspond to a same position in the three-dimensional space, and receives the selection of the moving body as the tracking target from the user in grouped units.

5. The moving body tracking device according to claim 1, wherein:
the moving body candidate extractor limits the region of the three-dimensional space from which the plurality of moving body candidates is extracted, based on the designated position and a trajectory of movement of the moving body as the tracking target.

6. A moving body tracking device which tracks a moving body for a ball game, the moving body tracking device comprising:
a video receiver which receives moving image frames of a ball game captured by each of a plurality of cameras at different positions;
a moving body selector which
displays a moving image frame captured by one of the cameras, and
receives, from a user, a designation of a position of a moving body selected as a tracking target in the moving image frame captured by the one of the cameras;
a moving body candidate extractor which
extracts a moving body candidate which is present in a region of a three-dimensional space, the region of the three-dimensional space being formed of a search range that changes according to the designated position in the moving image frame captured by the one of the cameras, and
extracts an image of the moving body candidate from a portion of a moving image frame captured by another camera, the portion corresponding to the region of the three-dimensional space; and
a moving body tracker which tracks the moving body as the tracking target, wherein
the moving body selector displays the moving body candidate image and receives the selection of the tracking target,
when the moving body selector receives the selection of the tracking target from the user, the moving body tracker corrects the moving body as the tracking target to the moving body selected by the user, and
the search range includes a point on a search axis in the three-dimensional space, the search axis being calculated based on the designated position.

7. The moving body tracking device according to claim 6, wherein:
the moving body candidate extractor calculates a likelihood of the moving body as the tracking target being present in the search range based on an image of the portion of the moving image frame captured by the other camera; and
the moving body candidate extractor determines based on the calculated likelihood whether the moving body candidate image is extracted or not from the portion of the moving image frame captured by the other camera.

8. The moving body tracking device according to claim 7, wherein:
when a plurality of moving body candidates are present in one of the search ranges, the moving body candidate extractor extracts a moving body candidate of which the likelihood is highest.

9. The moving body tracking device according to claim 7, wherein:
   a plurality of the search ranges include different points on the search axis, respectively; and
   for each of the search ranges, the moving body candidate extractor calculates the likelihood and determines based on the calculated likelihood whether the moving body candidate image is extracted or not.

10. The moving body tracking device according to claim 9, wherein:
    the moving body candidate extractor extracts a moving body candidate of which the likelihood exceeds a predetermined threshold value as a candidate for the moving body as the tracking target.

11. A method for tracking a moving body which tracks a moving body for a ball game, the method comprising:
    receiving moving image frames of a ball game captured by each of a plurality of cameras at different positions;
    displaying a moving image frame captured by one of the cameras;
    receiving, from a user, a designation of a position of a moving body selected as a tracking target in the moving image frame captured by the one of the cameras;
    extracting a plurality of moving body candidates which is present in a region of a three-dimensional space, the region of the three-dimensional space being formed of a search range that changes according to the designated position in the moving image frame captured by the one of the cameras;
    extracting an image of each of the plurality of moving body candidates from a portion of a moving image frame captured by another camera, the portion corresponding to the region of the three-dimensional space;
    tracking the moving body as the tracking target;
    displaying the moving body candidate images in order of height of position of each of the plurality of moving body candidates in the three-dimensional space and receiving the selection of the tracking target; and
    when receiving the selection of the tracking target from the user, correcting the tracking target to the moving body selected by the user.

12. A moving body tracking method which tracks a moving body for a ball game, the moving body tracking method comprising:
    receiving moving image frames of a ball game captured by each of a plurality of cameras at different positions;
    displaying a moving image frame captured by one of the cameras;
    receiving, from a user, a designation of a position of a moving body selected as a tracking target in the moving image frame captured by the one of the cameras;
    extracting a moving body candidate which is present in a region of a three-dimensional space, the region of the three-dimensional space being formed of a search range that changes according to the designated position in the moving image frame captured by the one of the cameras;
    extracting an image of the moving body candidate from a portion of a moving image frame captured by another camera, the portion corresponding to the region of the three-dimensional space;
    tracking the moving body as the tracking target;
    displaying the moving body candidate image and receives the selection of the tracking target; and
    when the selection of the tracking target is received from the user, correcting the moving body as the tracking target to the moving body selected by the user,
    wherein the search range includes a point on a search axis in the three-dimensional space, the search axis being calculated based on the designated position.

* * * * *